(12) United States Patent
Arima

(10) Patent No.: US 10,082,921 B2
(45) Date of Patent: Sep. 25, 2018

(54) DISPLAY APPARATUS

(71) Applicant: Japan Display Inc., Tokyo (JP)

(72) Inventor: Kazuya Arima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/432,632

(22) Filed: Feb. 14, 2017

(65) Prior Publication Data

US 2017/0235374 A1    Aug. 17, 2017

(30) Foreign Application Priority Data

Feb. 16, 2016    (JP) ................. 2016-027020

(51) Int. Cl.
*G06F 3/044* (2006.01)
*G06F 3/041* (2006.01)
*G09G 3/36* (2006.01)

(52) U.S. Cl.
CPC ............ *G06F 3/044* (2013.01); *G06F 3/0412* (2013.01); *G06F 3/0416* (2013.01); *G09G 3/3677* (2013.01); *G06F 2203/04108* (2013.01); *G09G 2354/00* (2013.01)

(58) Field of Classification Search
CPC combination set(s) only.
See application file for complete search history.

(56) References Cited

U.S. PATENT DOCUMENTS

2013/0265282 A1    10/2013    Nakagawa et al.
2013/0335362 A1    12/2013    Miyazawa et al.

FOREIGN PATENT DOCUMENTS

WO    2012/077576 A1    6/2012
WO    2012/121091 A1    9/2012

*Primary Examiner* — Van N Chow
(74) *Attorney, Agent, or Firm* — K&L Gates LLP

(57) ABSTRACT

According to an aspect, a display apparatus includes: a plurality of scanning lines including a first scanning line and a second scanning line, wherein the first scanning line is adjacent to the second scanning line in a first direction; a plurality of touch drive electrodes including a first touch drive electrode and a second touch drive electrode, wherein the first touch drive electrode is adjacent to the second touch drive electrode in the first direction; and an operation controller, wherein the operation controller is configured to provide a display scanning signal to a selected scanning line of the plurality of scanning lines and scan the plurality of scanning lines in a second direction and provide a touch drive signal to a selected touch drive electrode of the plurality of touch drive electrodes that is not coupled to the selected scanning line.

9 Claims, 21 Drawing Sheets

FIG. 17
RELATED ART

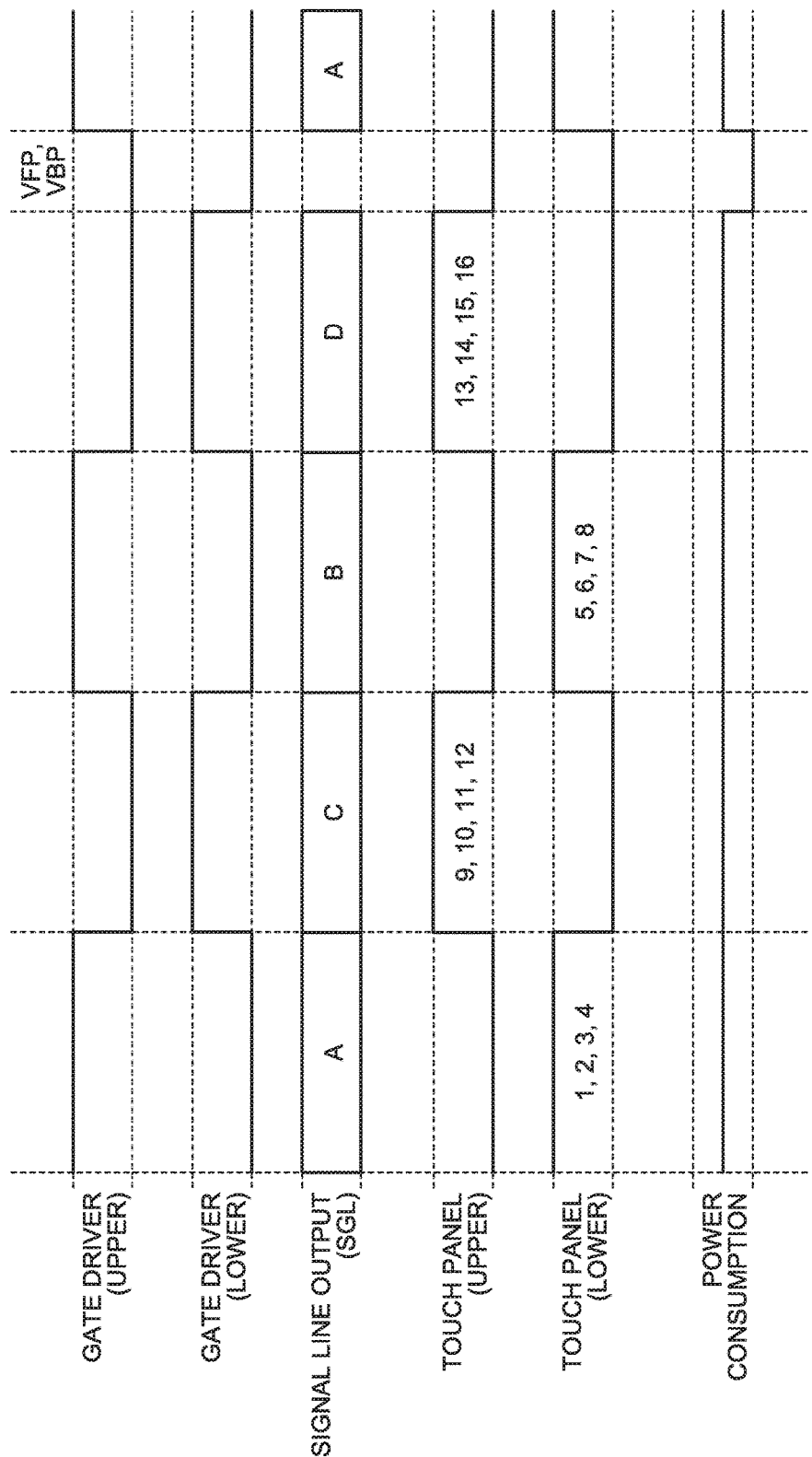

DISPLAY APPARATUS

CROSS-REFERENCE TO RELATED APPLICATIONS

This application claims priority from Japanese Application No. 2016-027020, filed on Feb. 16, 2016, the contents of which are incorporated by reference herein in its entirety.

BACKGROUND

1. Technical Field

The present invention relates to a display apparatus.

2. Description of the Related Art

There is known what is called a display apparatus with a touch detection function in which a touch panel type touch detection device having translucency is stacked on a display device that displays an image. When updating of the image by the display device and touch detection by the touch detection device are performed in parallel in such a display apparatus, noise caused by display driving of the display device may influence touch detection and deteriorate accuracy in touch detection. As a countermeasure against such noise, there is known a display device employing time division control for performing updating of the image and touch detection in a time division manner (for example, refer to WO 2012/121091).

However, with time division control as disclosed in WO 2012/121091, touch detection cannot be performed during an updating period of the image. Due to this, strict time constraints are imposed for performing touch detection, which makes it difficult to complete touch detection in all regions on which touch detection is supposed to be performed, and to increase frequency of output of a touch detection result following the completion thereof. Due to the restriction on time in which touch detection can be performed, strict restriction is also imposed on the number of times when touch detection is performed in the same region during a predetermined period, so that only a small number of touch detection results can be used. Thus, it is difficult to improve touch detection accuracy.

For the foregoing reasons, there is a need for a display apparatus that can cause the display device to operate in parallel with the touch detection device, and, at the same time, can reduce influence of the noise that may be caused by the operation of the display device on the touch detection device. Alternatively, there is a need for a display apparatus that can improve touch detection accuracy with touch detection taking more time and output frequency of the touch detection result more easily.

SUMMARY

According to an aspect, a display apparatus includes: a plurality of scanning lines, wherein the plurality of scanning lines include a first scanning line and a second scanning line, and the first scanning line is adjacent to the second scanning line in a first direction; a plurality of touch drive electrodes, wherein the plurality of touch drive electrodes include a first touch drive electrode and a second touch drive electrode, and the first touch drive electrode is adjacent to the second touch drive electrode in the first direction; and an operation controller, wherein the operation controller is configured to provide a display scanning signal to a selected scanning line of the plurality of scanning lines and scan the plurality of scanning lines in a second direction and provide a touch drive signal to a selected touch drive electrode of the plurality of touch drive electrodes that is not coupled to the selected scanning line.

According to another aspect, a display apparatus includes: a plurality of scanning lines, wherein the plurality of scanning lines include a first scanning line and a second scanning line, and the first scanning line is adjacent to the second scanning line in a first direction; a plurality of touch detection electrodes, wherein the plurality of touch detection electrodes include a first touch detection electrode and a second touch detection electrode, and the first touch detection electrode is adjacent to the second touch detection electrode in the first direction; and an operation controller, wherein the operation controller is configured to provide a display scanning signal to a selected scanning line of the plurality of scanning lines and scan the plurality of scanning lines in a second direction and control such that a selected touch detection electrode of the plurality of touch detection electrodes outputs a touch detection signal, wherein the selected touch detection electrode is not coupled to the selected scanning line.

According to another aspect, a display apparatus includes: a plurality of scanning lines; a plurality of touch detection electrodes, wherein the plurality of touch detection electrodes include a first touch detection electrode and a second touch detection electrode, and the first touch detection electrode is adjacent to the second touch detection electrode in a first direction; and an operation controller, wherein the operation controller is configured to provide a display scanning signal to a selected scanning line of the plurality of scanning lines and scan the plurality of scanning lines in a second direction and control such that a selected touch detection electrode of the plurality of touch detection electrodes outputs a touch detection signal, wherein the selected touch detection electrode is not coupled the selected scanning line.

BRIEF DESCRIPTION OF THE DRAWINGS

FIG. 17 is a timing chart illustrating a relation between a timing for updating an image and a timing for touch detection in a reference example;

FIG. 27 is a timing chart illustrating an example of a relation between a timing for updating an image and a timing for touch detection according to the third embodiment.

DETAILED DESCRIPTION

Figure 1:
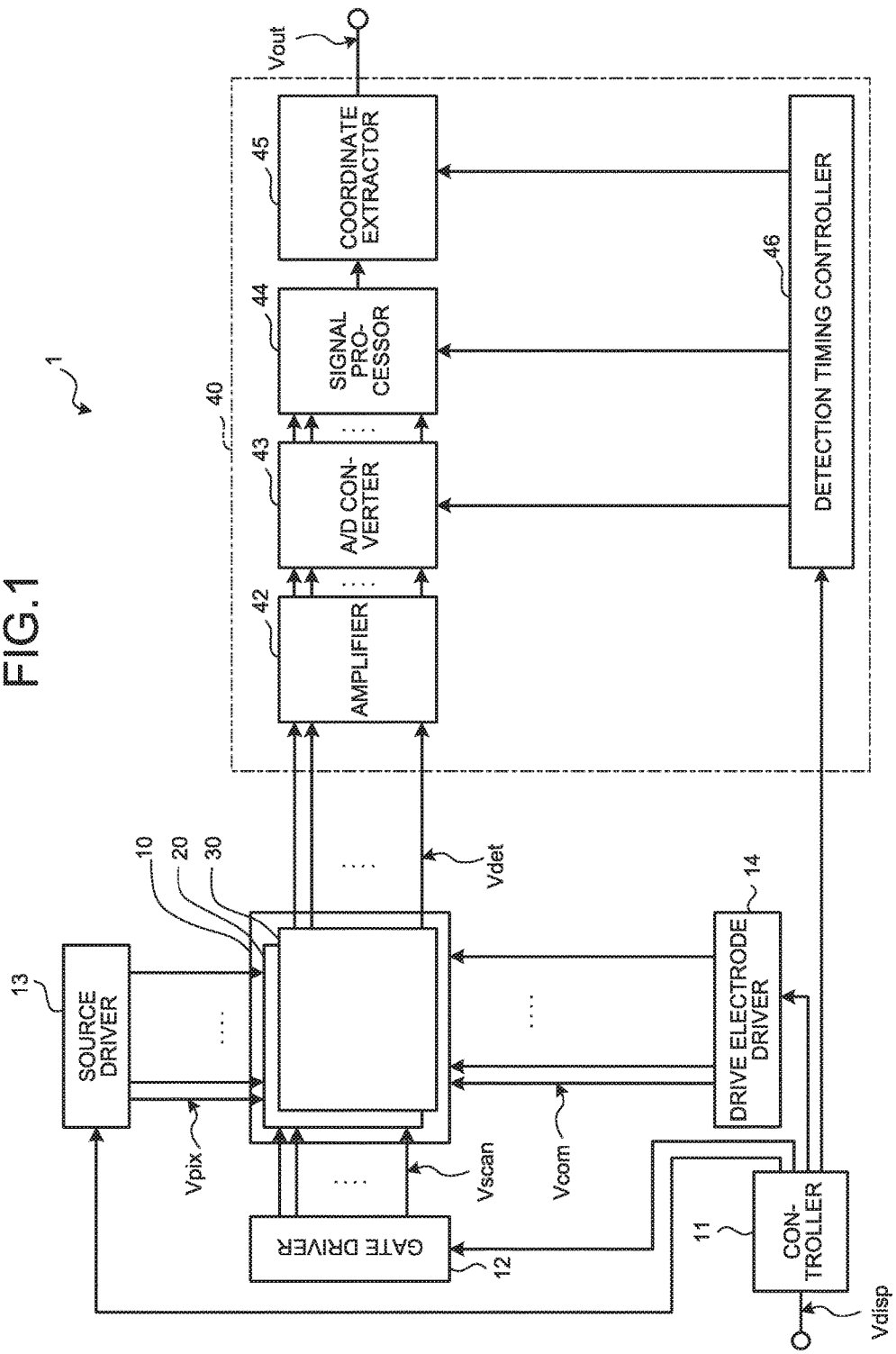
FIG. 1 is a block diagram illustrating a configuration example of a display apparatus with a touch detection function according to a first embodiment.

The following describes embodiments of the present invention with reference to the drawings. The disclosure is merely an example, and the present invention naturally encompasses an appropriate modification maintaining the gist of the invention that is easily conceivable by those skilled in the art. To further clarify the description, the width, the thickness, the shape, and the like of each component may be schematically illustrated in the drawings as compared with an actual aspect. However, the drawings merely provide examples, and are not intended to limit interpretation of the invention. The same element as that described in the drawing already discussed is denoted by the same reference numeral throughout the description and the drawings, and detailed description thereof will not be repeated in some cases.

In this disclosure, when an element is described as being "on" another element, the element can be directly on the other element, or there can be one or more elements between the element and the other element.

First Embodiment

FIG. 1 is a block diagram illustrating a configuration example of a display apparatus with a touch detection function according to a first embodiment. The display apparatus 1 with a touch detection function includes a display device 10 with a touch detection function, a controller 11, a gate driver 12, a source driver 13, a drive electrode driver 14, and a touch detection processing device 40. In the display apparatus 1 with a touch detection function, the display device 10 with a touch detection function incorporates a touch detection function. The display device 10 with a touch detection function is a device in which a liquid crystal display device 20 including a liquid crystal display element as a display element is integrated with a capacitance type touch detection device 30. Alternatively, the display device 10 with a touch detection function may be a device in which the capacitance type touch detection device 30 is mounted on the liquid crystal display device 20 including the liquid crystal display element as the display element. The liquid crystal display device 20 may be an organic electroluminescence (EL) display device, for example.

The liquid crystal display device 20 displays an image in a display region in which a plurality of pixels Pix is arranged. Specifically, the liquid crystal display device 20 is a device that sequentially performs scanning and display in accordance with a display scanning signal Vscan (hereinafter referred to as a scanning signal Vscan) supplied from the gate driver 12. The controller 11 is a circuit that supplies a control signal to each of the gate driver 12, the source driver 13, the drive electrode driver 14, and the touch detection processing device 40 based on a video signal Vdisp supplied from the outside to control these components to operate in synchronization with each other.

The gate driver 12 has a function of supplying, based on a control signal supplied from the controller 11, the scanning signal Vscan to a scanning line GCL to which a sub-pixel SPix as a display driving target of the display device 10 with a touch detection function is coupled. Specifically, the gate driver 12 includes, for example, gate drivers 12a and 12b described later (refer to FIG. 9).

The source driver 13 is a circuit that supplies a pixel signal Vpix to each sub-pixel SPix (described later) in the display device 10 with a touch detection function based on the control signal supplied from the controller 11.

The drive electrode driver 14 is a circuit that supplies a touch drive signal Vcomt and a display drive signal Vcomd (refer to FIG. 7) to a drive electrode COML serving as an example of a touch drive electrode, which will be described later, in the display device 10 with a touch detection function based on the control signal supplied from the controller 11.

A drive signal Vcom illustrated in FIG. 1 denotes both the touch drive signal Vcomt and the display drive signal Vcomd.

The touch detection processing device 40 is a circuit that detects whether there is a touch on the touch detection device 30 (a contact state or a proximity state described later) based on the control signal supplied from the controller 11 and a touch detection signal Vdet supplied from the touch detection device 30 of the display device 10 with a touch detection function, and obtains, when there is a touch, coordinates of a touch in a touch detection region. The touch detection processing device 40 includes an amplifier 42, an A/D converter 43, a signal processor 44, a coordinate extractor 45, and a detection timing controller 46.

The amplifier 42 amplifies the touch detection signal Vdet supplied from the touch detection device 30. The amplifier 42 may include a low-pass analog filter that removes a high frequency component (noise component) included in the touch detection signal Vdet and extracts touch components to be output.

Basic Principle of Capacitance Type Touch Detection

Figure 2:
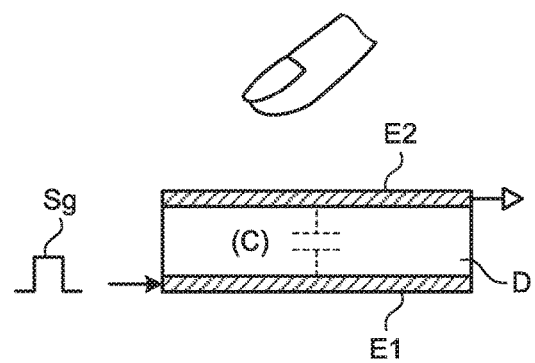
FIG. 2 is an explanatory diagram illustrating a state in which a finger is in a non-contact state or a non-proximate state for explaining a basic principle of a capacitance type touch detection system.
Figure 3:
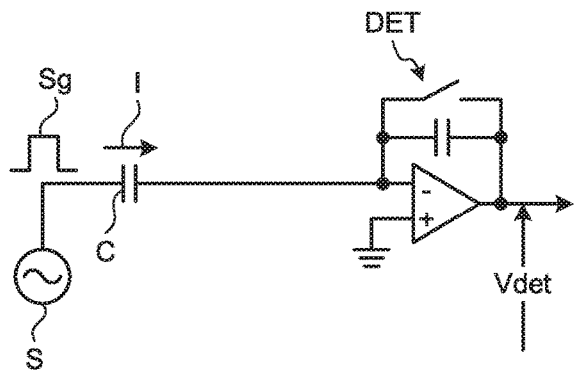
FIG. 3 is an explanatory diagram illustrating an example of an equivalent circuit of the state in which the finger is in a non-contact state or a non-proximate state as illustrated in FIG. 2.
Figure 4:
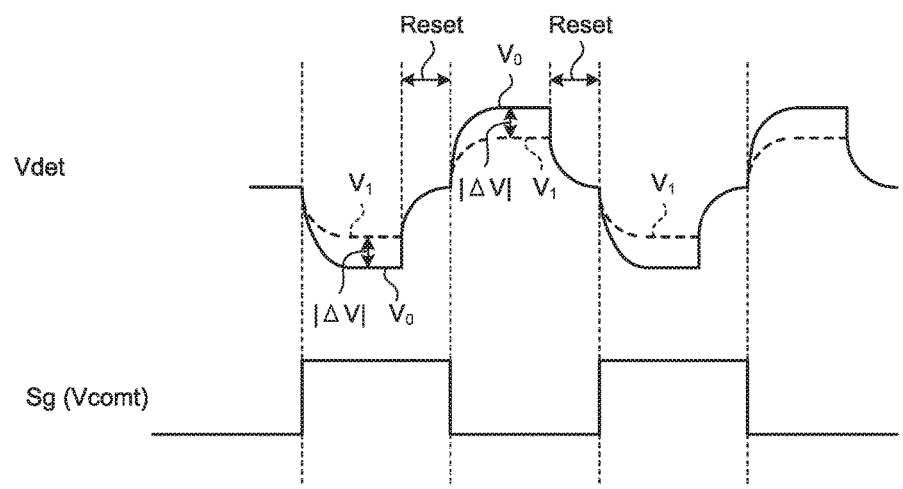
FIG. 4 is a diagram illustrating an example of waveforms of a touch drive signal and a touch detection signal.

The touch detection device 30 operates based on a basic principle of capacitance type touch detection and outputs the touch detection signal Vdet. With reference to FIGS. 1 to 4, the following describes the basic principle of touch detection in the display apparatus 1 with a touch detection function according to the first embodiment. FIG. 2 is an explanatory diagram illustrating a state in which a finger is in a non-contact state or a non-proximate state for explaining the basic principle of a capacitance type touch detection system. FIG. 3 is an explanatory diagram illustrating an example of an equivalent circuit of the state in which the finger is in a non-contact state or a non-proximate state as illustrated in FIG. 2. FIG. 4 is a diagram illustrating an example of waveforms of the touch drive signal and the touch detection signal.

For example, as illustrated in FIG. 2, a capacitive element C includes a pair of electrodes, that is, a touch drive electrode El and a touch detection electrode E2, which are opposed to each other with a dielectric D interposed therebetween. As illustrated in FIG. 3, one end of the capacitive element C is coupled to an alternating current (AC) signal source (drive signal source) S, and the other end thereof is coupled to a voltage detector (touch detection unit) DET. The voltage detector DET is, for example, an integrating circuit included in the amplifier 42 illustrated in FIG. 1.

When an AC rectangular wave Sg having a predetermined frequency (for example, a frequency of the order of several kHz to several hundreds kHz) is applied to the touch drive electrode E1 (one end of the capacitive element C) from the AC signal source S, an output waveform (touch detection signal Vdet) appears via the voltage detector DET coupled to the touch detection electrode E2 (the other end of the capacitive element C). The AC rectangular wave Sg corresponds to the touch drive signal Vcomt described later.

In a state in which the finger is not in contact with (or proximate to) the touch detection device (non-contact state), a current I corresponding to a capacitance value of the capacitive element C flows with charge and discharge of the capacitive element C. As illustrated in FIG. 4, the voltage detector DET converts variation in the current I in accordance with the AC rectangular wave Sg into variation in voltage (a waveform $V_0$ in a solid line).

In a state in which the finger is in contact with (or proximate to) the touch detection device (contact state), capacitance formed by the finger is in contact with or proximate to the touch detection electrode E2, so that capacitance corresponding to a fringe between the touch drive electrode E1 and the touch detection electrode E2 is shielded. Due to this, the capacitive element C functions as a capacitive element having a capacitance value smaller than the capacitance value in a non-contact state. The current I that varies depending on a change in the capacitive element C then flows therethrough. As illustrated in FIG. 4, the voltage detector DET converts variation in the current I corresponding to the AC rectangular wave Sg into variation in voltage (a waveform $V_1$ in a dotted line). In this case, amplitude of the waveform $V_1$ is smaller than that of the waveform $V_0$ described above. Accordingly, an absolute value $|\Delta V|$ of a voltage difference between the waveform $V_0$ and the waveform $V_1$ varies depending on influence of an external proximity object such as a finger. To accurately detect the absolute value $|\Delta V|$ of the voltage difference between the waveform $V_0$ and the waveform $V_1$, it is more preferable to provide, to an operation of the voltage detector DET, a period Reset for resetting charge and discharge of a capacitor in accordance with a frequency of the AC rectangular wave Sg through switching in the circuit.

The touch detection device 30 illustrated in FIG. 1 sequentially scans each detection block in accordance with the touch drive signal Vcomt supplied from the drive electrode driver 14 to perform touch detection.

In the touch detection device 30, the touch detection signal Vdet for each detection block is output from a plurality of touch detection electrodes TDL, which will be described later, to the analog/digital (A/D) converter 43 of the touch detection processing device 40 via the voltage detector DET illustrated in FIG. 3 or FIG. 4.

The A/D converter 43 is a circuit that samples each analog signal output from the amplifier 42 at a timing synchronized with the touch drive signal Vcomt, and converts the analog signal into a digital signal.

The signal processor 44 includes a digital filter that reduces a frequency component (noise component) other than a frequency at which the touch drive signal Vcomt is sampled included in the output signal of the A/D converter 43. The signal processor 44 is a logic circuit that detects whether there is a touch on the touch detection device 30 based on the output signal of the A/D converter 43. The signal processor 44 performs processing of extracting only a difference voltage caused by the finger. The difference voltage caused by the finger has the absolute value $|\Delta V|$ of the difference between the waveform $V_0$ and the waveform $V_1$ described above. The signal processor 44 may perform an averaging operation on the absolute value $|\Delta V|$ for each detection block to obtain an average value of the absolute value $|\Delta V|$. Due to this, the signal processor 44 can reduce influence of the noise. The signal processor 44 compares the detected difference voltage caused by the finger with a predetermined threshold voltage. If the difference voltage is equal to or larger than the threshold voltage, the signal processor 44 determines that an external proximity object is in a contact state. If the difference voltage is smaller than the threshold voltage, the signal processor 44 determines that the external proximity object is in a non-contact state. In this way, the touch detection processing device 40 can perform touch detection.

The coordinate extractor 45 is a logic circuit that obtains, when a touch is detected by the signal processor 44, touch panel coordinates at which the touch is detected. The detection timing controller 46 controls the A/D converter 43, the signal processor 44, and the coordinate extractor 45 to operate in synchronization with each other. The coordinate extractor 45 outputs the touch panel coordinates as a signal output Vout.

Module

Figure 5:
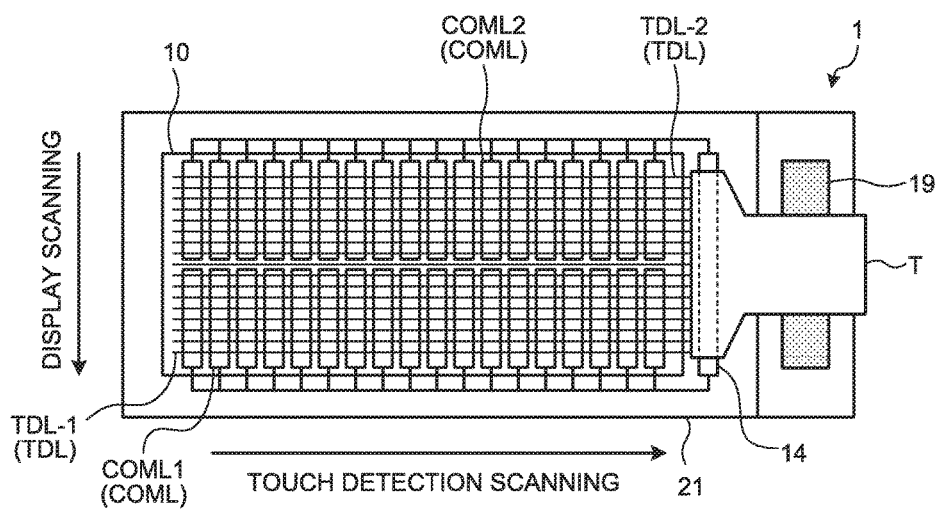
FIG. 5 is a diagram illustrating an example of a module on which the display apparatus with a touch detection function is mounted.

FIG. 5 is a diagram illustrating an example of a module on which the display apparatus with a touch detection function is mounted. As illustrated in FIG. 5, when the display apparatus 1 with a touch detection function is mounted on the module, the drive electrode driver 14 described above may be formed on a glass substrate 21.

As illustrated in FIG. 5, the display apparatus 1 with a touch detection function includes the display device 10 with a touch detection function, the drive electrode driver 14, and the chip on glass (COG) 19. FIG. 5 schematically illustrates the display device 10 with a touch detection function that includes the drive electrodes COML and the touch detection electrodes TDL formed to three-dimensionally intersect with the drive electrode COML in a direction (third direction) perpendicular to a surface of the glass substrate 21 described later. The drive electrode COML is formed, for example, in a direction along one side of the display device 10 with a touch detection function, and the touch detection electrode TDL is formed, for example, in a direction along the other side of the display device 10 with a touch detection function. An output end of the touch detection electrode TDL is arranged on the other side of the display device 10 with a touch detection function, and coupled to the touch detection processing device 40 mounted on the outside of this module via a terminal unit T including a flexible substrate and the like. The drive electrode driver 14 is formed on the glass substrate 21. The COG 19 is a chip mounted on the glass substrate 21, and incorporates circuits required for a display operation such as the controller 11 illustrated in FIG. 1.

Figure 9:
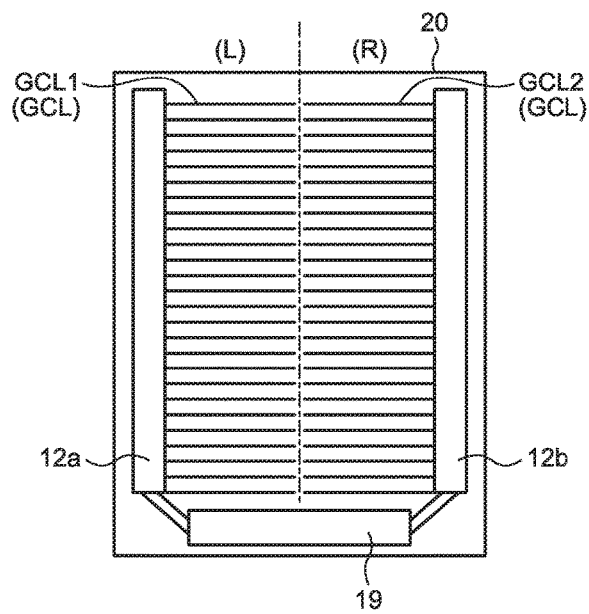
FIG. 9 is a diagram illustrating wiring of scanning lines in a liquid crystal display device according to the first embodiment.

The gate driver 12 may be formed on a substrate included in the liquid crystal display device 20 such as the gate drivers 12a and 12b illustrated in FIG. 9, but the gate driver 12 is not limited thereto. Alternatively, the gate driver 12 may be incorporated in the COG 19.

Display Device With Touch Detection Function

Figure 6:
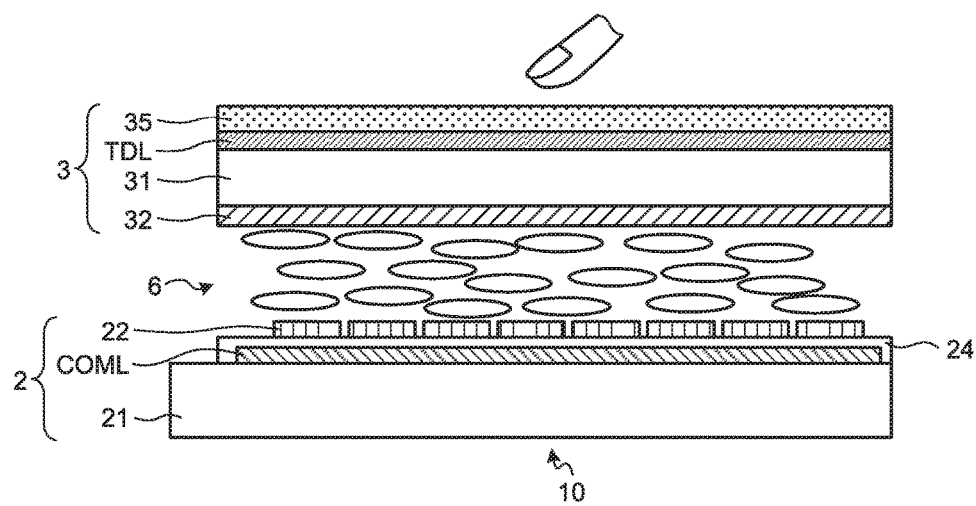
FIG. 6 is a cross-sectional view of a schematic structure of a display device with a touch detection function according to the first embodiment.
Figure 7:
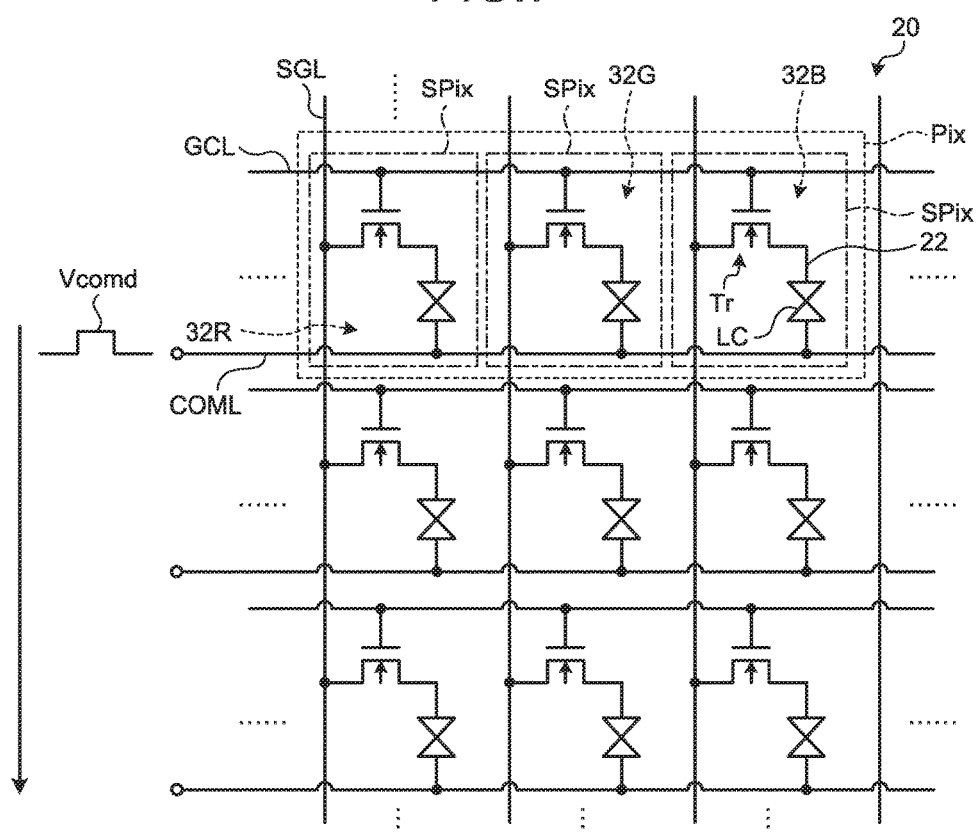
FIG. 7 is a circuit diagram illustrating a pixel arrangement of the display device with a touch detection function according to the first embodiment.

Next, the following describes a configuration example of the display device 10 with a touch detection function in detail. FIG. 6 is a cross-sectional view of a schematic structure of the display device with a touch detection function according to the first embodiment. FIG. 7 is a circuit diagram illustrating a pixel arrangement of the display device with a touch detection function according to the first embodiment. The display device 10 with a touch detection function includes a first substrate 2, a second substrate 3 opposed to a surface of the first substrate 2 in a direction perpendicular thereto, and a liquid crystal layer 6 interposed between the first substrate 2 and the second substrate 3.

The first substrate 2 includes the glass substrate 21, a plurality of pixel electrodes 22 arranged on the glass substrate 21 in a matrix, a plurality of drive electrodes COML formed between the glass substrate 21 and the pixel electrodes 22, and an insulating layer 24 that insulates the pixel electrodes 22 from the drive electrodes COML. The glass substrate 21 is provided with thin film transistor (TFT) elements Tr of the respective sub-pixels SPix illustrated in FIG. 7 and wiring such as signal lines SGL and the scanning lines GCL. Each of the signal lines SGL supplies the pixel signal Vpix to a corresponding pixel electrode 22 illustrated in FIG. 6, and each of the scanning lines GCL drives corresponding TFT elements Tr. In this way, the signal line SGL extends along a plane parallel with the surface of the glass substrate 21, and supplies the pixel signal Vpix for displaying an image to the pixel. The liquid crystal display device 20 illustrated in FIG. 7 includes a plurality of sub-pixels SPix arranged in a matrix. The sub-pixel SPix includes the TFT element Tr and a display element (for example, a liquid crystal element LC). The TFT element Tr includes a thin film transistor. In this example, the TFT element Tr includes an n-channel metal oxide semiconductor (MOS) TFT. One of a source and a drain of the TFT element Tr is coupled to the signal line SGL, a gate thereof is coupled to the scanning line GCL, and the other one of the source and the drain is coupled to one end of the liquid crystal element LC via the corresponding pixel electrode 22. In other word, the pixel electrode 22 is coupled to a corresponding scanning line GCL. Specifically, the pixel electrode 22 is coupled to the corresponding scanning line GCL via the corresponding TFT element Tr. One end of the liquid crystal element LC is coupled to the other one of the source and the drain of the TFT element Tr, and the other end thereof is coupled to the drive electrode COML. For example, the liquid crystal element LC includes the pixel electrode 22, and the pixel electrode 22 is coupled to the drain of the TFT element Tr. A plurality of liquid crystal elements LC are coupled to a plurality of drive electrodes COML via the insulating layer 24 and the liquid crystal layer 6. The sub-pixel SPix is then driven in accordance with an electric charge given to the pixel electrode 22 and the drive electrode COML. In this way, the pixel electrode 22 and the drive electrode COML function as electrodes used for driving the sub-pixel SPix. In the present embodiment, the drive electrode COML, the insulating layer 24, and the pixel electrode 22 are stacked on the glass substrate 21 in this order, but the stacking order is not limited thereto. The pixel electrode 22, the insulating layer 24, and the drive electrode COML may be stacked on the glass substrate 21 in this order, or the pixel electrode 22 and the drive electrode COML may be formed in the same layer via the insulating layer 24.

The sub-pixel SPix illustrated in FIG. 7 is coupled to another sub-pixel SPix belonging to the same row in the liquid crystal display device 20 via the scanning line GCL. The scanning line GCL is coupled to the gate driver 12, and the scanning signal Vscan is supplied to the scanning line GCL from the gate driver 12. The sub-pixel SPix is coupled to another sub-pixel SPix belonging to the same column in the liquid crystal display device 20 via the signal line SGL. The signal line SGL is coupled to the source driver 13, and the pixel signal Vpix is supplied to the signal line SGL from the source driver 13. The sub-pixel SPix is also coupled to another sub-pixel SPix belonging to the same row in the liquid crystal display device 20 via the drive electrode COML. The drive electrode COML is coupled to the drive electrode driver 14, and the display drive signal Vcomd is supplied to the drive electrode COML from the drive electrode driver 14.

The gate driver 12 illustrated in FIG. 1 applies the scanning signal Vscan to the gate of the TFT element Tr of the pixel Pix via the scanning line GCL illustrated in FIG. 7 to sequentially select, as a display driving target, the sub-pixels SPix sharing a continuous scanning line GCL from one row (one horizontal line) of the sub-pixels SPix formed in a matrix in the liquid crystal display device 20. The source driver 13 illustrated in FIG. 1 supplies the pixel signal Vpix to each of the sub-pixels SPix sequentially selected by the gate driver 12 via the signal line SGL illustrated in FIG. 7. Each of the sub-pixels SPix performs display output in accordance with the supplied pixel signal Vpix. The drive electrode driver 14 illustrated in FIG. 1 applies the display drive signal Vcomd to the drive electrodes COML, and drives each block including a predetermined number of drive electrodes COML.

In the liquid crystal display device 20, the gate driver 12 drives the scanning lines GCL to perform line-sequential scanning on the scanning lines GCL in a time division manner The drive electrode driver 14 applies the display drive signal Vcomd to a block including the drive electrode COML corresponding to a position of the sub-pixel SPix to which the pixel signal Vpix is supplied from the source driver 13.

Figure 8:
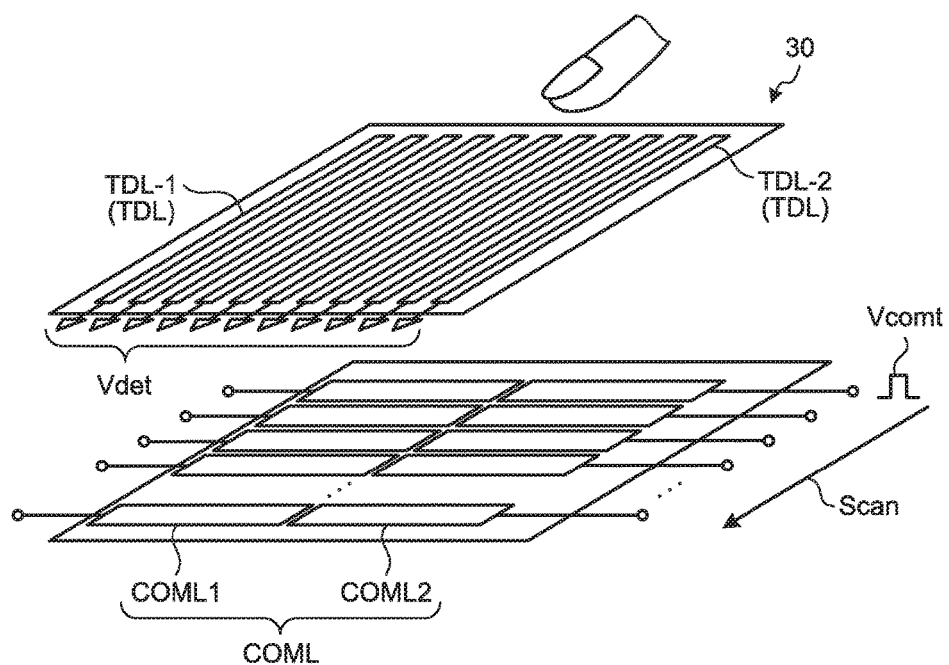
FIG. 8 is a perspective view of a configuration example of a drive electrode and a touch detection electrode of the display device with a touch detection function according to the first embodiment.

The drive electrode COML according to the first embodiment functions as a drive electrode for the liquid crystal display device 20, and also functions as a drive electrode for the touch detection device 30. In other words, the controller 11 (for example, the COG 19) serving as an operation controller causes the drive electrode driver 14 to apply the display drive signal Vcomd to the drive electrode COML. FIG. 8 is a perspective view representing a configuration example of the drive electrode and the touch detection electrode of the display device with a touch detection function according to the first embodiment. As illustrated in FIG. 6, the drive electrode COML illustrated in FIG. 8 is opposed to the pixel electrode 22 in a direction perpendicular to the surface of the glass substrate 21. The touch detection device 30 includes the drive electrode COML arranged in the first substrate 2 and the touch detection electrode TDL arranged in the second substrate 3. The touch detection electrode TDL includes a stripe electrode pattern extending in a direction intersecting with an extending direction of an electrode pattern of the drive electrode COML. The touch detection electrode TDL is opposed to the drive electrode COML in a direction perpendicular to the surface of the glass substrate 21. Each of the electrode patterns of the touch detection electrodes TDL is coupled to an input end of the amplifier 42 of the touch detection processing device 40. In electrode patterns in which the drive electrode COML intersects with the touch detection electrode TDL, capacitance is generated at an intersecting portion thereof. The form of the touch detection electrodes TDL or the drive electrodes COML (drive electrode block) is not limited to a plurality of stripes. For example, the touch detection electrodes TDL or the drive electrodes COML (drive electrode block) may have a comb-teeth shape. Alternatively, it is sufficient that the touch detection electrodes TDL or the drive electrodes COML (drive electrode block) are divided into a plurality of parts, and a slit that divides the drive electrodes COML may have a linear shape or a curved shape. Display electrodes of the pixels Pix are electrodes used for displaying images with the pixels Pix. The display electrodes include a common electrode and/or a display electrode 22, for example. In the first embodiment, the drive electrode COML doubles as the common electrode. That is, the drive electrode COML functions as the touch drive electrode El and as the common electrode. More specifically, the controller 11 (for example, the COG 19) serving as the operation controller causes the drive electrode driver 14 to apply the touch drive signal Vcomt and the display drive signal Vcomd to the drive electrode COML. The drive electrode COML to which the touch drive signal Vcomt is applied functions as the touch drive electrode El. The drive electrode COML to which the display drive signal Vcomd is applied functions as the common electrode. In the present embodiment, the touch drive electrode (drive electrode COML) doubles as the common electrode (one of the display electrodes) but is not limited thereto. The touch drive electrode may double as the pixel electrode 22 (the other of the display electrodes).

With such a configuration, in the touch detection device 30, the drive electrode driver 14 drives the drive electrode blocks to perform line-sequential scanning on the drive electrode blocks in a time division manner in performing a touch detection operation. Accordingly, one detection block including one or more of the drive electrodes COML is sequentially selected in a scanning direction Scan. The touch detection signal Vdet is then output from the touch detection electrode TDL. In this way, touch detection for one detection block is performed by the touch detection device 30. That is, the drive electrode block corresponds to the touch drive electrode E1 according to the basic principle of touch detection described above, and the touch detection electrode TDL corresponds to the touch detection electrode E2. The touch detection device 30 detects a touch in accordance with the basic principle. In this way, the touch detection device 30 performs touch detection on a screen side of the display device (liquid crystal display device 20). As illustrated in FIG. 8, the electrode patterns intersecting with each other constitute a capacitance type touch sensor in a matrix. Thus, by scanning over the entire touch detection surface of the touch detection device 30, a position where an external proximity object is brought into contact with or proximate to the touch detection device can be detected.

The liquid crystal layer 6 modulates light passing therethrough depending on a state of an electric field. For example, used is a liquid crystal display device including liquid crystals of lateral electric-field mode such as in-plane switching (IPS) including fringe field switching (FFS). An orientation film may be arranged between the liquid crystal layer 6 and the first substrate 2, and between the liquid crystal layer 6 and the second substrate 3 illustrated in FIG. 6.

The second substrate 3 includes a glass substrate 31 and a color filter 32 formed on one surface of the glass substrate 31. The touch detection electrode TDL serving as a detection electrode for the touch detection device 30 is formed on the other surface of the glass substrate 31, and a polarizing plate 35 is arranged on the touch detection electrode TDL. In the present embodiment, each of the substrates in the first substrate and the second substrate is assumed to be a glass substrate, but the substrates are not limited thereto. The substrates may be a film substrate and the like.

In the color filter 32 illustrated in FIG. 6, for example, color regions of the color filter colored in three colors of red (R), green (G), and blue (B) are periodically arranged, any one of color regions 32R, 32G, and 32B (refer to FIG. 7) of three colors of R, G, and B is associated with the single sub-pixel SPix illustrated in FIG. 7, and the color regions 32R, 32G, and 32B as one set constitute the single pixel Pix. Pixels Pix are arranged in a matrix along a direction parallel with the scanning line GCL and along a direction parallel with the signal line SGL to form the display region described later. The color filter 32 is opposed to the liquid crystal layer 6 in a direction perpendicular to the glass substrate 21. In this way, the sub-pixel SPix can perform monochromatic color display. The liquid crystal display device 20 displays an image by performing display output using the pixel Pix obtained by combining the sub-pixels SPix colored by different colors through the color filter 32. That is, the liquid crystal display device 20 is a display device including a plurality of pixels Pix for displaying the image. Another combination of colors may be used for the color filter 32 so long as the colors are different from each other. The number of colors is not limited to three, and may be four or more. The color filter 32 may also include a non-colored region or a region at which no color filter is provided. In other words, there may be a sub-pixel SPix that is not colored through the color filter 32.

Wiring of Scanning Line

Figure 10:
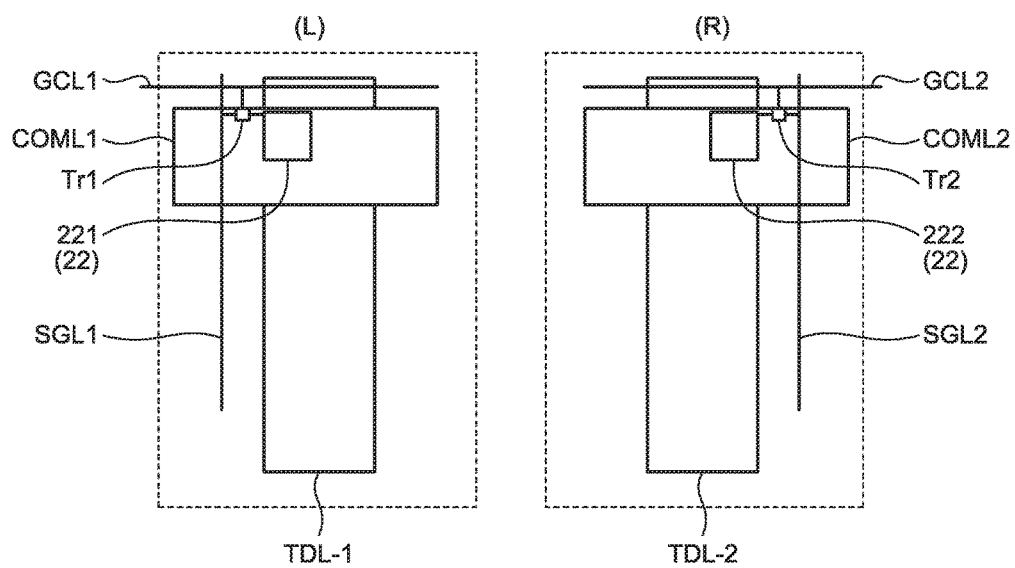
FIG. 10 is a diagram illustrating a first scanning line, a first drive electrode, a first touch detection electrode, a first pixel electrode, and the like that are arranged in a left region, and a second scanning line, a second drive electrode, a second touch detection electrode, a second pixel electrode, and the like that are arranged in a right region.

FIG. 9 is a diagram illustrating wiring of the scanning lines GCL in the liquid crystal display device 20 according to the first embodiment. FIG. 10 is a diagram illustrating a first scanning line GCL1, a first drive electrode COML1, a first touch detection electrode TDL-1, a first pixel electrode 221, and the like that are arranged in a left region L, and a second scanning line GCL2, a second drive electrode COML2, a second touch detection electrode TDL-2, a second pixel electrode 222, and the like that are arranged in a right region R. In this description, when the first scanning line GCL1 and the second scanning line GCL2 are described without being distinguished from each other, each of the first scanning line GCL1 and the second scanning line GCL2 is referred to as the scanning line GCL. Similarly, when the first drive electrode COML1 and the second drive electrode COML2 are described without being distinguished from each other, each of the first drive electrode COML1 and the second drive electrode COML2 is referred to as the drive electrode COML. Similarly, when the first touch detection electrode TDL-1 and the second touch detection electrode TDL-2 are described without being distinguished from each other, each of the first touch detection electrode TDL-1 and the second touch detection electrode TDL-2 is referred to as the touch detection electrode TDL. Similarly, when the first pixel electrode 221 and the second pixel electrode 222 are described without being distinguished from each other, each of the first pixel electrode 221 and the second pixel electrode 222 is referred to as the pixel electrode 22. In the liquid crystal display device 20 according to the first embodiment, two or more scanning lines GCL extending along a direction intersecting with the scanning direction are arranged in the direction intersecting with the scanning direction. Specifically, as illustrated in FIG. 9 for example, two scanning lines GCL (the first scanning line GCL1 and the second scanning line GCL2) are present on a single line along the direction intersecting with the scanning direction. In the first embodiment, an arrangement interval or an arrangement position of the scanning lines GCL included in one of the two regions is the same as that of the other region with respect to the scanning direction of the liquid crystal display device 20. For example, the two scanning lines (the first scanning line GCL1 and the second scanning line GCL2) on each line are arranged at respective opposed positions across an intermediate position in a row direction (first direction), that is, an intermediate line dividing the display region of the liquid crystal display device 20 into two parts along a column direction (second direction). Thus, a first region (left region L) and a second region (right region R) are adjacent to each other in the first direction with the intermediate line therebetween. In the present embodiment, the first scanning line GCL1 and the second scanning line GCL2 are arranged on a straight line along the row direction and across the intermediate line dividing the display region into two parts, but the arrangement of the scanning lines GCL is not limited thereto. Three or more scanning lines GCL may extend on a single line such that the three or more scanning lines GCL correspond to respective three or more parts of the single line. A plurality of scanning lines GCL (for example, the first scanning line GCL1 and the second scanning line GCL2) may be different in length. The scanning lines GCL of the first embodiment include the first scanning line GCL1 and the second signal line GCL2. The first scanning line GCL1 is arranged in the first region, and the second scanning line GCL2 is arranged in the second region. The first scanning line GCL1 and the second scanning line GCL2 are arranged in the row direction (first direction). The liquid crystal display device 20 has the first region (left region L) in which the first scanning lines GCL1 are arranged and the second region (right region L) in which the second scanning lines GCL2 are arranged. Each of the first region (left region L) and the second region (right region R) individually functions as a sub-display region. Updating of the image can be performed individually on the sub-display regions.

As illustrated in FIG. 9, the liquid crystal display device 20 according to the first embodiment includes the gate driver 12 that outputs the scanning signal Vscan, under control of the COG 19, to each of the scanning lines GCL in the divided regions in the direction intersecting with the scanning direction. Specifically, the liquid crystal display device 20 includes two gate drivers 12a and 12b that output the scanning signal Vscan to the first scanning line GCL1 in the first region (left region L) and the second scanning line GCL2 in the second region (right region R), respectively. The gate driver 12a is coupled to the first scanning line GCL1 in the left region L. The gate driver 12b is coupled to the second scanning line GCL2 in the right region R. That is, when the scanning signal Vscan is output to the first scanning line GCL1 in the left region L, the gate driver 12a operates. When the scanning signal Vscan is output to the second scanning line GCL2 in the right region R, the gate driver 12b operates. The first pixel electrode 221 is coupled to the first scanning line GCL1. The second pixel electrode 222 is coupled to the second scanning line GCL2.

More specifically, the COG 19 causes either the gate driver 12a or the gate driver 12b to operate to update content of a display output in sub-display region of either the left region L or the right region R in a display output period excluding a vertical front porch (VFP) and a vertical back porch (VBP). The VFP is a period from when an output of the pixel signals Vpix for one frame is finished to when a vertical synchronizing signal (vsync) related to an output of an image of the next frame is started to be output. The VBP is a period from when the output of the vertical synchronizing signal (vsync) is finished to when the pixel signal Vpix is started to be output. For example, the gate drivers 12a and 12b are shift registers. By applying a start pulse to the shift registers at different timings, timings for operating the gate drivers 12a and 12b are shifted from each other. Thus, the scanning signal Vscan is applied to either the first scanning line GCL1 in the left region L or the second scanning line GCL2 in the right region R at a time, such that content of the display output in only one of the sub-display regions is updated at a time.

Arrangement of touch detection electrode and drive electrode

Figure 11:
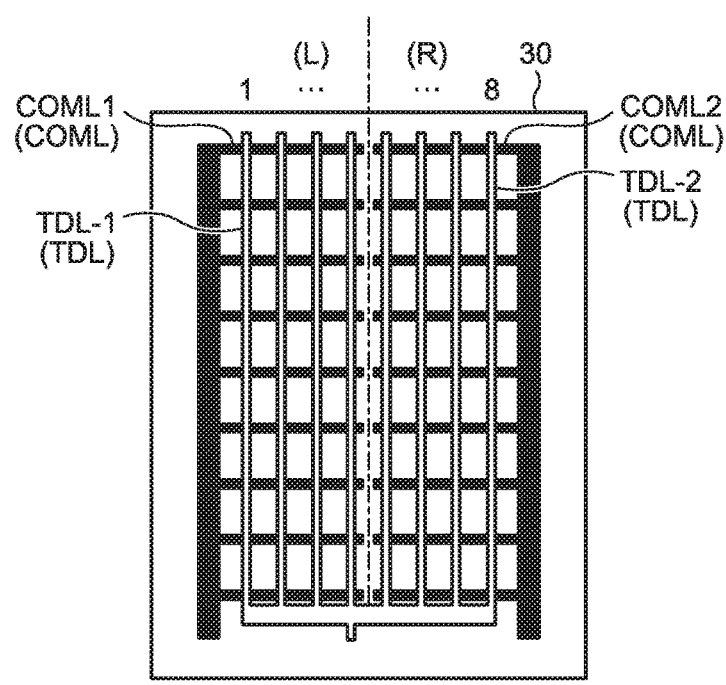
FIG. 11 is a diagram illustrating wiring of touch detection electrodes and drive electrodes in a touch detection device according to the first embodiment.

The touch detection device 30 according to the first embodiment is divided into a plurality of parts in a direction intersecting with the scanning direction of the drive electrode COML. Specifically, the two drive electrodes COML (the first drive electrode COML1 and the second drive electrode COML2) on a single line along the row direction are present in the first region (left region L) and the second region (right region R), respectively. The left region L and the right region R are adjacent to each other in the first direction. In the present embodiment, an arrangement interval or an arrangement position of the drive electrodes COML included in one of the two regions is the same as that of the other region with respect to the scanning direction of the liquid crystal display device 20. Specifically, as illustrated in FIG. 11 for example, the first drive electrode COML1 is in the left region L, and the second drive electrode COML2 is in the right region R. In the first embodiment, the two drive electrodes COML (the first drive electrode COML1 and the second drive electrode COML2) on a straight line are arranged at respective opposed positions across an intermediate position in the row direction, that is, an intermediate line dividing the touch detection region of the touch detection device 30 into two parts along the column direction. Thus, each of the left region L and the right region R has a sub-touch detection region (also referred to as a touch detection target region). Touch detection can be performed individually on the sub-touch detection regions. In the present embodiment, the length of the drive electrode COML is a length such that the two drive electrodes COML are arranged on a straight line along the row direction across the intermediate line, but the number of drive electrodes COML on a single line and the length of each drive electrode COML on a single line are not limited thereto. Three or more drive electrodes COML may extend on a single line such that the three or more drive electrodes COML correspond to respective three or more parts of the single line. A plurality of drive electrodes COML on a single line may be different in length. The extending direction of the drive electrode COML according to the first embodiment is parallel to the extending direction of the scanning line GCL, but the extending direction of the drive electrode COML is not limited thereto. For example, the extending direction of the drive electrode COML may be parallel to the extending direction of the signal line SGL.

FIG. 11 is a diagram illustrating wiring of the touch detection electrodes TDL and the drive electrodes COML in the touch detection device 30 according to the first embodiment. The touch detection device 30 according to the first embodiment includes a plurality of sub-touch detection regions that are obtained by dividing the touch detection region in a direction intersecting with a touch scanning direction, and each of the sub-touch detection regions includes one or more touch detection electrodes TDL. Specifically, as illustrated in FIG. 11 for example, the touch detection device 30 according to the first embodiment includes the first region (left region L) and the second region (right region R) that are arranged in a direction (first direction) intersecting with the scanning direction. The touch detection device 30 according to the first embodiment also includes the first touch detection electrode TDL-1 arranged to form capacitance between itself and the first drive electrode COML1 in the left region L, and the second touch detection electrode TDL-2 arranged to form capacitance between itself and the second drive electrode COML2 in the right region R. The touch detection electrodes TDL extend in a direction (second direction) intersecting with the extending direction of the drive electrode COML. Specifically, the touch detection electrode TDL extends along the column direction (second direction).

In FIG. 11, the number 1 is given to the leftmost electrode of the first touch detection electrodes TDL-1 arranged to form capacitance between themselves and the first drive electrode COML1 in the left region L, and the number 4 is given to the rightmost electrode of the first touch detection electrodes TDL-1. The number 5 is given to the leftmost electrode of the second touch detection electrodes TDL-2 arranged to form capacitance between themselves and the second drive electrode COML2 in the right region R, and the number 8 is given to the rightmost electrode of the second touch detection electrodes TDL-2. In the following description about touch detection, an operation using eight touch detection electrodes TDL is described for convenience. The eight touch detection electrodes TDL include four first touch detection electrodes TDL-1 corresponding to the number 1 to 4 and four second touch detection electrodes TDL-2 corresponding to the number 5 to 8. The given numbers are used to distinguish the eight touch detection electrodes TDL from each other.

FIG. 10 illustrates, as an example, one first scanning line GCL1, one first drive electrode COML1, one first touch detection electrode TDL-1, one first pixel electrode 221, one signal line SGL, and one TFT element Tr that are arranged in the left region L, and one second scanning line GCL2, one second drive electrode COML2, one second touch detection electrode TDL-2, one second pixel electrode 222, one signal line SGL, and one TFT element Tr that are arranged in the right region R. However, in actuality, a plurality of scanning lines GCL, a plurality of drive electrodes COML, a plurality of touch detection electrodes TDL, a plurality of pixel electrodes 22, a plurality of signal lines SGL, and a plurality of TFT elements Tr may be arranged in each of the left region L and the right region R. As illustrated in FIG. 10, the first pixel electrode 221 and the first drive electrode COML1 overlap each other when viewed from the third direction. The second pixel electrode 222 and the second drive electrode COML2 overlap each other when viewed from the third direction. The first drive electrode COML1 and the first touch detection electrode TDL-1 overlap each other when viewed from the third direction. In FIG. 10, at least part of the first drive electrode COML1 covers at least part of first touch detection electrode TDL-1. The second drive electrode COML2 and the second touch detection electrode TDL-2 overlap each other when viewed from the third direction. In FIG. 10, at least part of the second drive electrode COML2 covers at least part of second touch detection electrode TDL-2. In addition, among the TFT elements Tr in FIG. 10, the TFT element Tr in the left region L is referred to as a first TFT element Tr1, and the TFT element Tr in the right region R is referred to as a second TFT element Tr2. Among the signal lines SGL in FIG. 10, the signal line SGL in the left region L is referred to as a first signal line DGL1, and the signal line SGL in the right region R is referred to as a second signal line SGL2. The first scanning line GCL1 and the first signal line SGL1 are coupled to the first pixel electrode 221 via the first TFT element Tr1. The second scanning line GCL2 and the second signal line SGL2 are coupled to the second pixel electrode 222 via the second TFT element Tr2.

Figure 12:
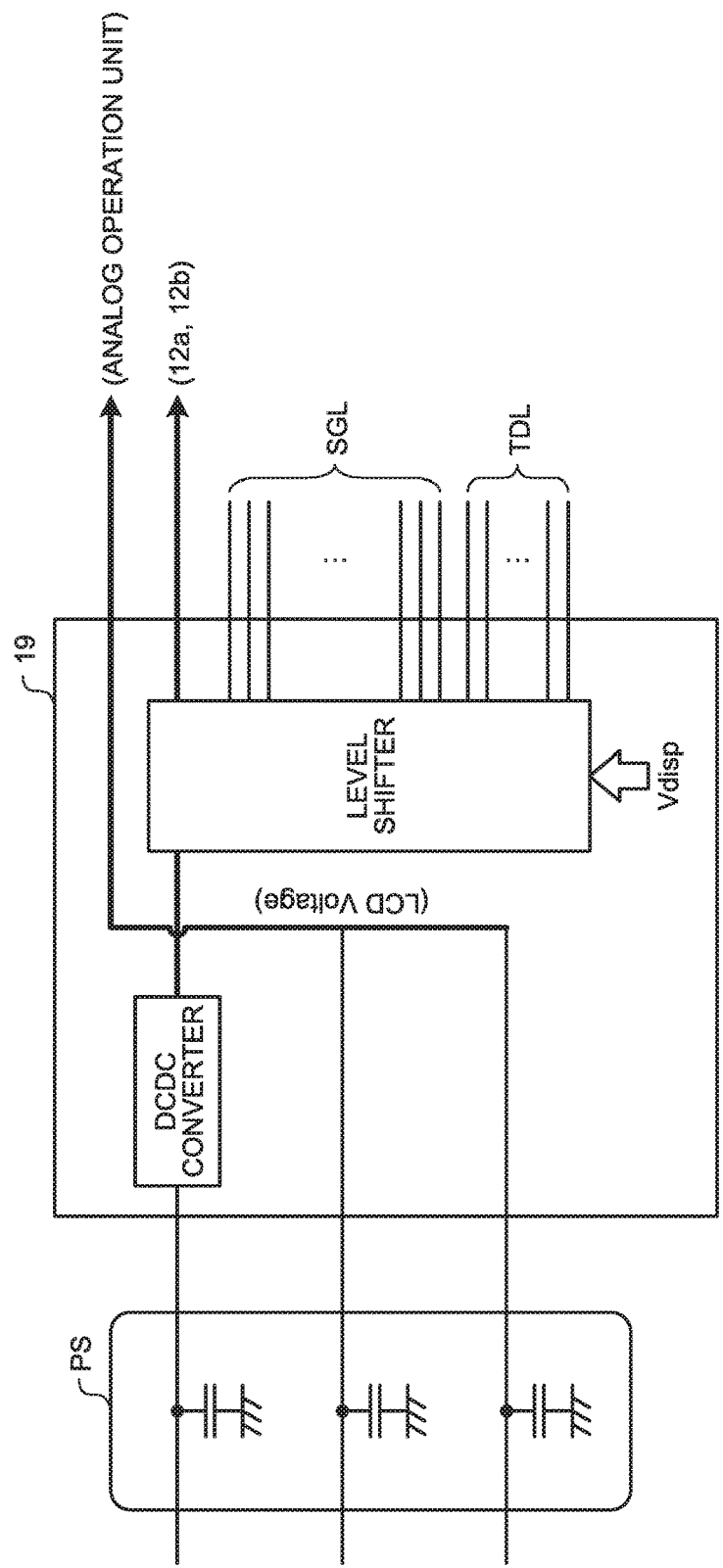
FIG. 12 is a diagram illustrating an example of a schematic configuration of a COG and a power supply according to the first embodiment.

Next, the following describes a power supply PS that functions as a power source of a signal output to the display device 10 with a touch detection function via the COG 19 with reference to FIG. 12. FIG. 12 is a diagram illustrating an example of a schematic configuration of the COG 19 and the power supply PS according to the first embodiment. As illustrated in FIG. 12, the power supply PS includes a capacitor coupled to a power supply path. The capacitor is a ceramic capacitor, for example. Alternatively, the capacitor may be another capacitor such as a film capacitor.

When the capacitor included in the power supply PS is a ceramic capacitor, the capacitor is expanded and contracted depending on variation in power consumption of the COG 19 (electrostrictive effect). This expansion and contraction cause vibration in the substrate on which the power supply PS is arranged. When a cycle of the vibration falls within a frequency band (20 Hz to 20 kHz) audible to humans, an audible sound is generated (sound squeak).

The power consumption related to the operation of the display apparatus 1 with a touch detection function depends greatly on ON/OFF of an output of the pixel signal Vpix via the signal line SGL, and on an operation related to updating of an image corresponding thereto. If the output of the pixel signal Vpix is periodically turned ON/OFF, variation in the power consumption causes periodic amplitude in load variation of the power supply PS. Such amplitude of the load variation increases a load of the power supply PS. Such amplitude of the load variation causes a sound squeak when the capacitor included in the power supply PS is a ceramic capacitor. That is, variation in power consumption is preferably smaller. Thus, the COG 19 according to the first embodiment has a mechanism for reducing the variation in power consumption regarding operation control of the liquid crystal display device 20 and the touch detection device 30. The following describes the mechanism with reference to FIGS. 13 and 14.

Relation Between Display Updating Region and Sub-touch Detection Region

Figure 13:
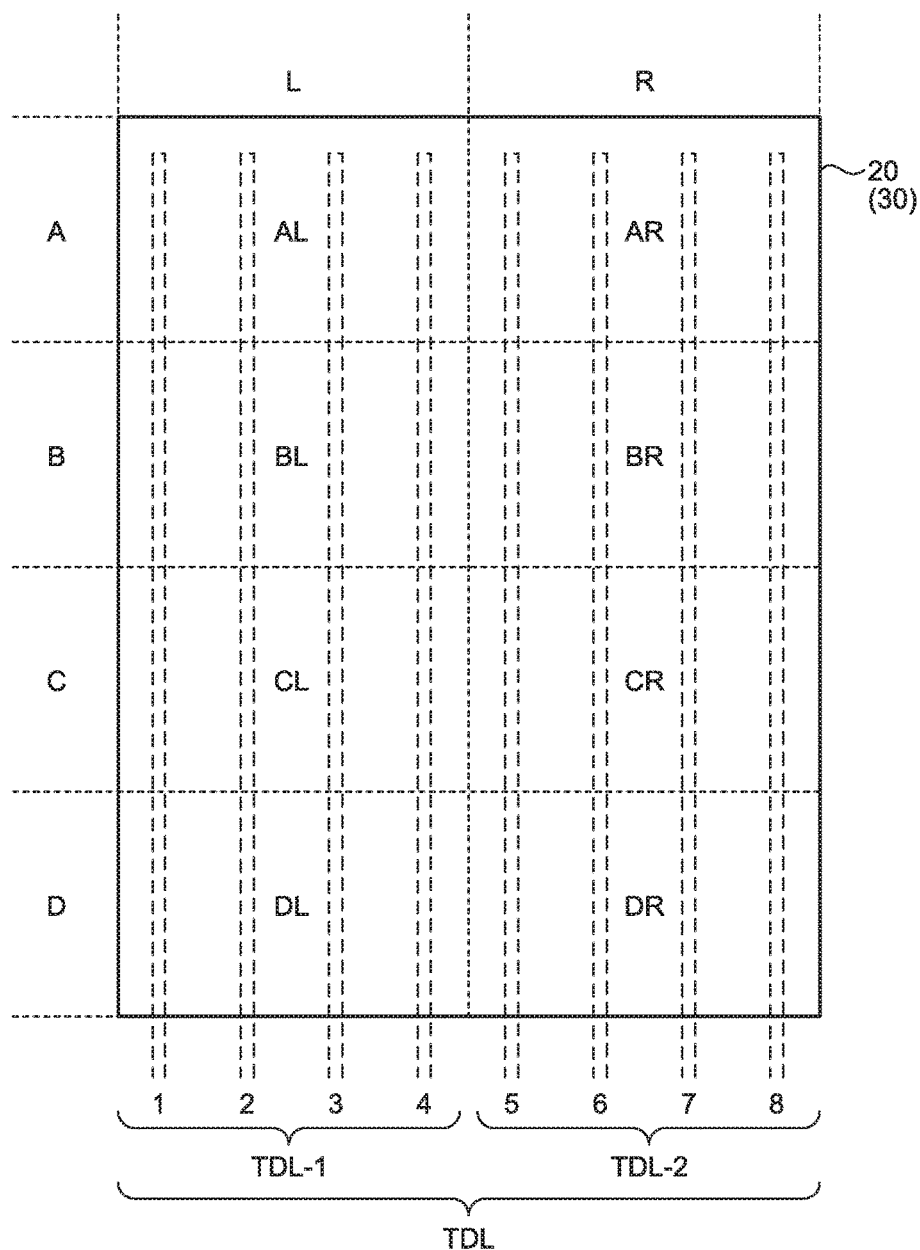
FIG. 13 is a diagram illustrating an example of a relation between a partition of display updating regions and an arrangement of the touch detection electrodes according to the first embodiment.

FIG. 13 is a diagram illustrating an example of a relation between a partition of display updating regions and an arrangement of the touch detection electrodes TDL according to the first embodiment. The liquid crystal display device 20 according to the first embodiment can individually control an output timing of the scanning signal Vscan on the left and right sub-display regions via the wiring of the scanning line GCL described with reference to FIGS. 9 and 10. Thus, according to the first embodiment, the content of the display output can be individually updated on the left and the right. That is, the liquid crystal display device 20 according to the first embodiment includes a plurality of partial display units in which a plurality of scanning lines GCL arranged parallel to each other along the scanning direction (column direction) of a screen are individually arranged. More specifically, the liquid crystal display device 20 according to the first embodiment includes two partial display units to divide the screen into two parts along a direction (row direction) intersecting with the scanning direction (column direction). The screen is a surface on a side of the liquid crystal display device 20 on which an image is displayed. In the present embodiment, the screen side refers to a side of the display device 10 with a touch detection function on which touch detection is performed. In FIG. 6, the screen side corresponds to a side of the liquid crystal layer 6 on which the touch detection electrode TDL is provided. In the liquid crystal display device 20, an image displayed in the display region can be seen from the screen side. The display region includes two or more sub-display regions. In other word, the display region is a region in which an entire image is displayed with all the respective sub-display regions included in the plurality of partial display units.

More specifically, in the liquid crystal display device 20 according to the first embodiment, in addition to the left region L and the right region R that are two-division regions, the display updating region can be subdivided in units of lines in the scanning direction (column direction) by individually controlling the output timing of the scanning signal Vscan for each scanning line GCL by the COG 19. FIG. 13 illustrates an example of the display updating regions, that is, regions AL, AR, BL, BR, CL, CR, DL, and DR that are obtained by dividing each of the two sub-display regions, the left region L and the right region R, into four regions of A, B, C, and D in the column direction. In FIG. 13, each of the regions AL, AR, BL, BR, CL, CR, DL, and DR is the display updating region. For example, when the display region in which 40 lines of scanning lines GCL are arranged in the column direction is divided into regions AL, AR, BL, BR, CL, CR, DL, and DR as eight display updating regions, each display updating region includes ten scanning lines GCL. The first scanning lines GCL1 included in the regions AL, BL, CL, and DL included in the left region L such as in this embodiment are coupled to the gate driver 12a. The second scanning lines GCL2 included in the regions AR, BR, CR, and DR included in the right region R are coupled to the gate driver 12b. In such a coupling relation, control may be performed for each display updating region by changing a timing for applying the scanning signal Vscan to the scanning line GCL by each of the gate drivers 12a and 12b. However, this is merely an example of a specific configuration for controlling the timing for applying the scanning signal Vscan, and the specific configuration is not limited thereto. The specific configuration can be appropriately modified.

According to the present embodiment, the gate driver 12 may be provided for each display updating region and coupled to the scanning lines GCL included in the sub-display regions. The gate driver 12 includes, for example, the shift registers, and the shift registers for the respective display updating regions are controlled by an individual start pulse. Thus, the scanning signal Vscan is supplied to the scanning lines GCL included in the respective display updating regions on a display updating region basis.

The present embodiment exemplifies a case of dividing the display updating region into eight parts. However, this is merely a specific example of division of the display updating region, and the division of the display updating region is not limited thereto. The division of the display updating region can be appropriately modified.

The touch detection device 30 according to the first embodiment can control the timing for individually performing touch detection on the left region L or the right region R of the sub-touch detection region overlapping the display region due to the arrangement of the first touch detection electrodes TDL-1 to which the respective numbers 1 to 4 are given, the second touch detection electrodes TDL-2 to which the respective numbers 5 to 8 are given, the first drive electrodes COML1, and the second drive electrodes COML2 described with reference to FIG. 11. More specifically, by applying the touch drive signal Vcomt to the first drive electrodes COML1 corresponding to the left region L, the touch detection signal Vdet of the left region L can be detected from among the first touch detection electrodes TDL-1 in the left region L. On the other hand, by applying the touch drive signal Vcomt to the second drive electrodes COML2 corresponding to the right region R, the touch detection signal Vdet of the right region R can be detected from among the second touch detection electrodes TDL-2 in the right region R. When the scanning signal Vscan is applied to the first scanning line GCL1, the touch drive signal Vcomt is applied to the second touch drive electrode COML2. The second touch drive electrode COML2 is different from the first touch drive electrode COML1 facing the first pixel electrode 221 coupled to the first scanning line GCL1 via the first TFT element Tr1. In this way, touch detection in each region can be individually controlled by individually applying the touch drive signal Vcomt to the drive electrode COML corresponding to each region.

Further, divisional positions at which the display region is divided into a plurality of sub-display regions coincide with divisional positions at which the touch detection region is divided into a plurality of sub-touch detection regions, and thus the sub-touch detection region on which touch detection is being performed does not overlap the sub-display region on which display is being performed. Specifically, pixels included in the left region L of the two sub-display regions obtained by dividing the display region in a direction intersecting with the scanning direction are the same as pixels included in the left region L of the two sub-touch detection regions obtained by dividing the touch detection region in a direction intersecting with the scanning direction. The pixels included in the right region R of the two sub-display regions obtained by dividing the display region in a direction intersecting with the scanning direction are the same as pixels included in the right region R of the two sub-touch detection regions obtained by dividing the touch detection region in a direction intersecting with the scanning direction. That is, the display region and the touch detection region are divided such that the sub-display region and the corresponding sub-touch detection region include the same pixels in at least the direction intersecting with the scanning direction. In other words, the scanning lines GCL (for example, the first scanning line GCL1 and the second scanning line GCL2) arranged along the row direction have a length required for driving the pixels at a boundary between the left region L and the right region R. Thus the drive electrodes COML arranged along the row direction have a length required for driving the pixels at the boundary between the left region L and the right region R. For example, the length of the first scanning line GCL1 and the length of the first drive electrode COML1 included in the left region L are substantially the same, and the length of the second scanning line GCL2 and the length of the second drive electrode COML2 included in the right region R are substantially the same. With such a configuration, display and touch detection can be performed at the same timing in different regions arranged in a direction intersecting with the scanning direction. For example, during a time when the scanning signal Vscan is applied to the first scanning line GCL1 in the left region L and when the display drive signal Vcomd that is an electric charge (DC voltage) for display is applied to the drive electrode COML included in the left region L, the touch drive signal Vcomt (AC voltage) can be applied to the second drive electrode COML2 included in the right region R to detect the detection signal Vdet from the second touch detection electrodes TDL-2 included in the right region R.

With the arrangement of the drive electrode COML described with reference to FIG. 11, the touch detection device 30 according to the first embodiment can reduce electrical influence on the second drive electrodes COML2 in the right region R when the first touch detection electrodes TDL-1 in the left region L operate, and can reduce electrical influence on the first drive electrodes COML1 in the left region L when the second touch detection electrodes TDL-2 in the right region R operate. That is, when touch detection is performed by either the first touch detection electrodes TDL-1 or the second touch detection electrodes TDL-2, touch detection by the other ones thereof is prevented from being performed, so that the drive electrode COML in either the left region L or the right region R is used for the touch detection operation. Each of the sub-touch detection region of the left region L and the sub-touch detection region of the right region R functions as a partial detection unit that can individually perform touch detection. That is, the touch detection device 30 according to the first embodiment includes a plurality of partial detection units. Each of the partial detection units includes one or more of a plurality of touch detection electrodes TDL parallel to each other and one or more of a plurality of drive electrodes COML, the drive electrodes COML being parallel to each other along a direction (for example, the row direction) different from a direction in which the touch detection electrodes TDL are parallel to each other (for example, the column direction). The drive electrodes COML and the touch detection electrodes TDL form capacitance therebetween. More specifically, the touch detection device 30 according to the first embodiment includes two partial detection units to divide the screen into two parts along the direction (row direction) orthogonal to the scanning direction (column direction). In other words, the touch detection region is a region obtained by combining all the sub-touch detection regions on which touch detection is performed by the respective partial detection units.

As described above with reference to FIG. 13, in the display device 10 with a touch detection function according to the first embodiment, two display updating regions in which the image is individually updated by a plurality of partial display units are arranged in at least a direction (for example, the row direction) different from the scanning direction (column direction). Further, two sub-touch detection regions on which touch detection is individually performed by a plurality of partial detection units are arranged in at least a direction (for example, the row direction) different from the scanning direction (column direction). Examples of the two display updating regions in the row direction include: the display updating region AL and the display updating region AR; the display updating region BL and the display updating region BR; the display updating region CL and the display updating region CR; and the display updating region DL and the display updating region DR. The two sub-touch detection regions in the row direction are the sub-touch detection region of the left region L and the sub-touch detection region of the right region R.

Timing Control For Updating of Image and Touch Detection

Figure 14:
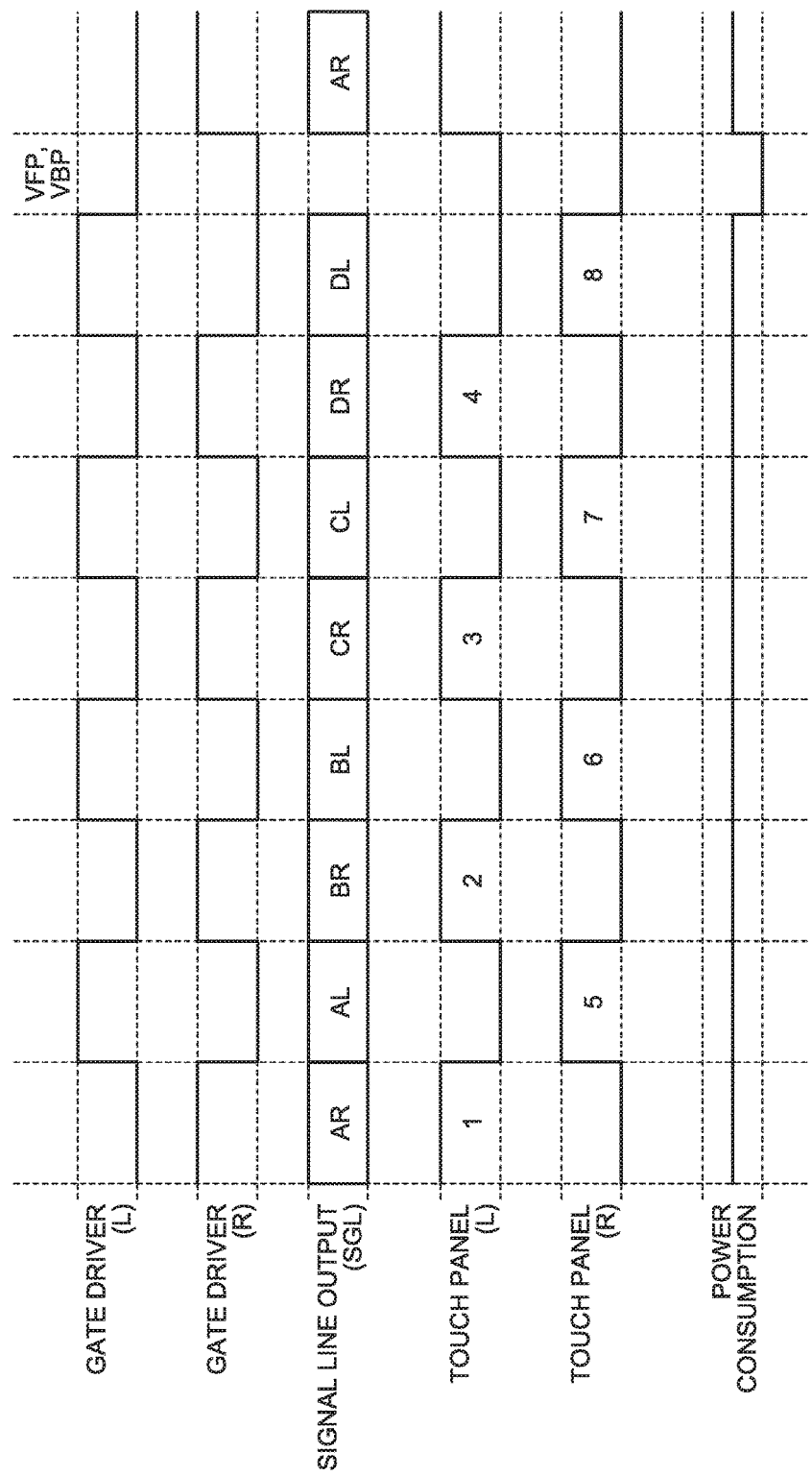
FIG. 14 is a timing chart illustrating an example of a relation between a timing for updating an image and a timing for touch detection according to the first embodiment.

FIG. 14 is a timing chart illustrating an example of a relation between a timing for updating an image and a timing for touch detection according to the first embodiment. In the first embodiment, updating of the image in the display updating region included in the sub-display region of one of the left region L and the right region R and touch detection in the sub-touch detection region of the other one of the left region L and the right region R are performed in parallel with each other. Specifically, as illustrated in FIG. 14 for example, at a timing for outputting the pixel signal Vpix for updating the image to the signal line SGL in the display updating region AR in the right region R, the COG 19 causes the gate driver 12b for the right region R to operate to output the scanning signal Vscan to the second scanning line GCL2 in the display updating region AR, and causes the drive electrode driver 14 to apply the display drive signal Vcomd to the second drive electrode COML2 in the right region R. At the same time, the COG 19 causes the drive electrode driver 14 to apply the touch drive signal Vcomt to the first drive electrode COML1 in the sub-touch detection region of the left region L, and performs touch detection based on the touch detection signal Vdet from the first touch detection electrode TDL-1 in the sub-touch detection region in the left region L. At this timing, updating of the image in the right region R and touch detection in the left region L are performed in parallel with each other.

At a timing for outputting the pixel signal Vpix for updating the image to the signal line SGL in the display updating region AL in the left region L, the COG 19 causes the gate driver 12a for the left region L to operate to output the scanning signal Vscan to the first scanning line GCL1 in the display updating region AL, and causes the drive electrode driver 14 to apply the display drive signal Vcomd to the first drive electrode COML1 in the left region L. At the same time, the COG 19 causes the drive electrode driver 14 to apply the touch drive signal Vcomt to the second drive electrode COML2 in the sub-touch detection region of the right region R, and performs touch detection based on the touch detection signal Vdet from the second touch detection electrode TDL-2. At this timing, updating of the image in the left region L and touch detection in the right region R are performed in parallel with each other.

With the mechanism described above, the COG 19 updates the image in the display updating regions AR, AL, BR, BL, CR, CL, DR, and DL in this order, and performs touch detection based on the touch detection signal Vdet in order of the numbers 1, 5, 2, 6, 3, 7, 4, and 8 in parallel with the updating of the image. In this way, the COG 19 functions as an operation controller that controls the operation of the liquid crystal display device 20 and the touch detection processing device 40. The COG 19 controls operations of the partial display units and the partial detection units so that a position of the display updating region in which the image is updated during a predetermined period is different from a position of the sub-touch detection region (touch detection target region) on which touch detection is performed during the predetermined period. The COG 19 according to the first embodiment causes the updating of the image in the display updating region to be in parallel with touch detection in the sub-touch detection region. In the first embodiment, a switch timing of the display updating region in which the image is updated is the same as a switch timing of the sub-touch detection region on which touch detection is performed.

In accordance with the operation control by the COG 19 described with reference to FIG. 14, output of the pixel signal Vpix that greatly influences power consumption and processing corresponding thereto are maintained as processing for updating the image in the display updating region corresponding to ⅛ of the entire display region. Thus, the power consumption related to updating of the image is maintained at power consumption related to processing for updating the image in the display updating region corresponding to ⅛ of the entire display region. In this way, variation in power consumption can be reduced, so that load variation and a load of the power supply PS can be made smaller Even when the capacitor included in the power supply PS is a ceramic capacitor, periodic variation in power consumption caused by ON/OFF of the output of the pixel signal Vpix and by the corresponding operation related to updating of the image can be reduced, so that generation of a sound squeak can be reduced.

According to the first embodiment, with the arrangement of the drive electrodes COML described with reference to FIG. 11, electrical influence on the second drive electrode COML2 in the right region R can be reduced when the first touch detection electrodes TDL-1 in the left region L operate, and electrical influence on the first drive electrode COML1 in the left region L can be reduced when the second touch detection electrodes TDL-2 in the right region R operate. As described above with reference to FIG. 14, under control of the COG 19, when touch detection is performed by either the first touch detection electrode TDL-1 or the second touch detection electrode TDL-2, touch detection by the other one thereof is not performed, and updating of the image is performed on the display updating region in the sub-display region corresponding to the other ones at the same timing as that of the touch detection. Thus, the operation of the liquid crystal display device 20 can be caused to be performed in parallel with the operation of the touch detection device 30, and, at the same time, influence on the touch detection device 30 by noise that may be caused in accordance with the operation of the liquid crystal display device 20 can be reduced. Accordingly, more time is easily allocated for touch detection as compared with time division control in the related art, and touch detection accuracy of touch detection taking more time and output frequency (report rate) of a touch detection result can be improved more easily.

According to the first embodiment, the switch timing of the display updating region in which the image is updated is the same as the switch timing of the sub-touch detection region on which touch detection is performed, so that the same periodic signal (clock signal and the like) can be used for managing the switch timings. The switch timings are caused to be the same, so that a portion in which the image is updated easily alternates with a portion on which touch detection is performed, and it becomes more easy to cause the operation of the liquid crystal display device 20 to be performed in parallel with the operation of the touch detection device 30, and, at the same time, to reduce influence on the touch detection device 30 by noise that may be caused in accordance with the operation of the liquid crystal display device 20.

According to the first embodiment, the drive electrode (drive electrode COML) related to touch detection doubles as the display electrode for the pixel Pix, so that the number of components due to the electrode sharing can be easily reduced and the size of the display device 10 with a touch detection function can be easily reduced.

Reference Example

Figure 15:
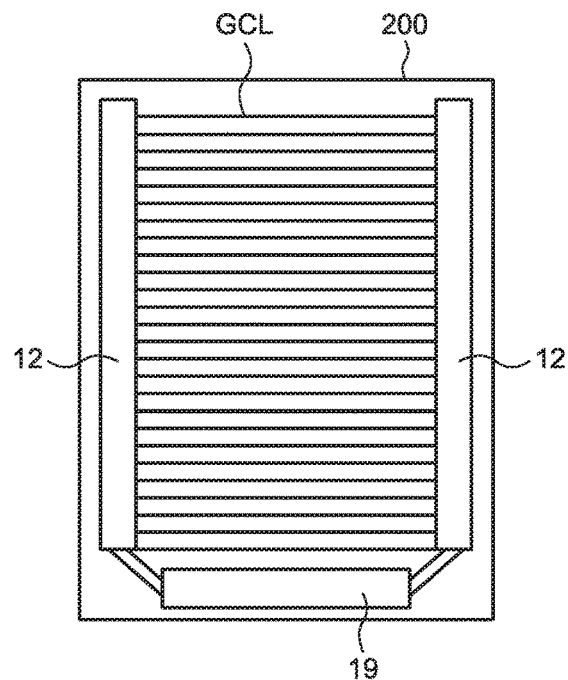
FIG. 15 is a diagram illustrating wiring of scanning lines in a liquid crystal display device in the related art as a reference example.
Figure 16:
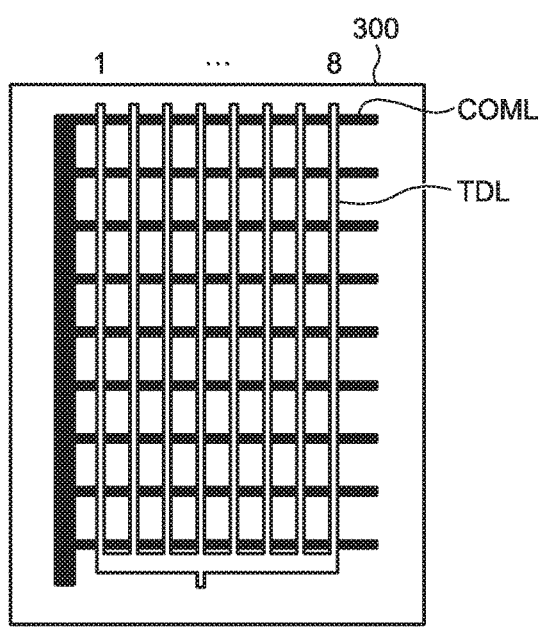
FIG. 16 is a diagram illustrating wiring of touch detection electrodes and drive electrodes in the touch detection device in the related art as a reference example.
Figure 17:
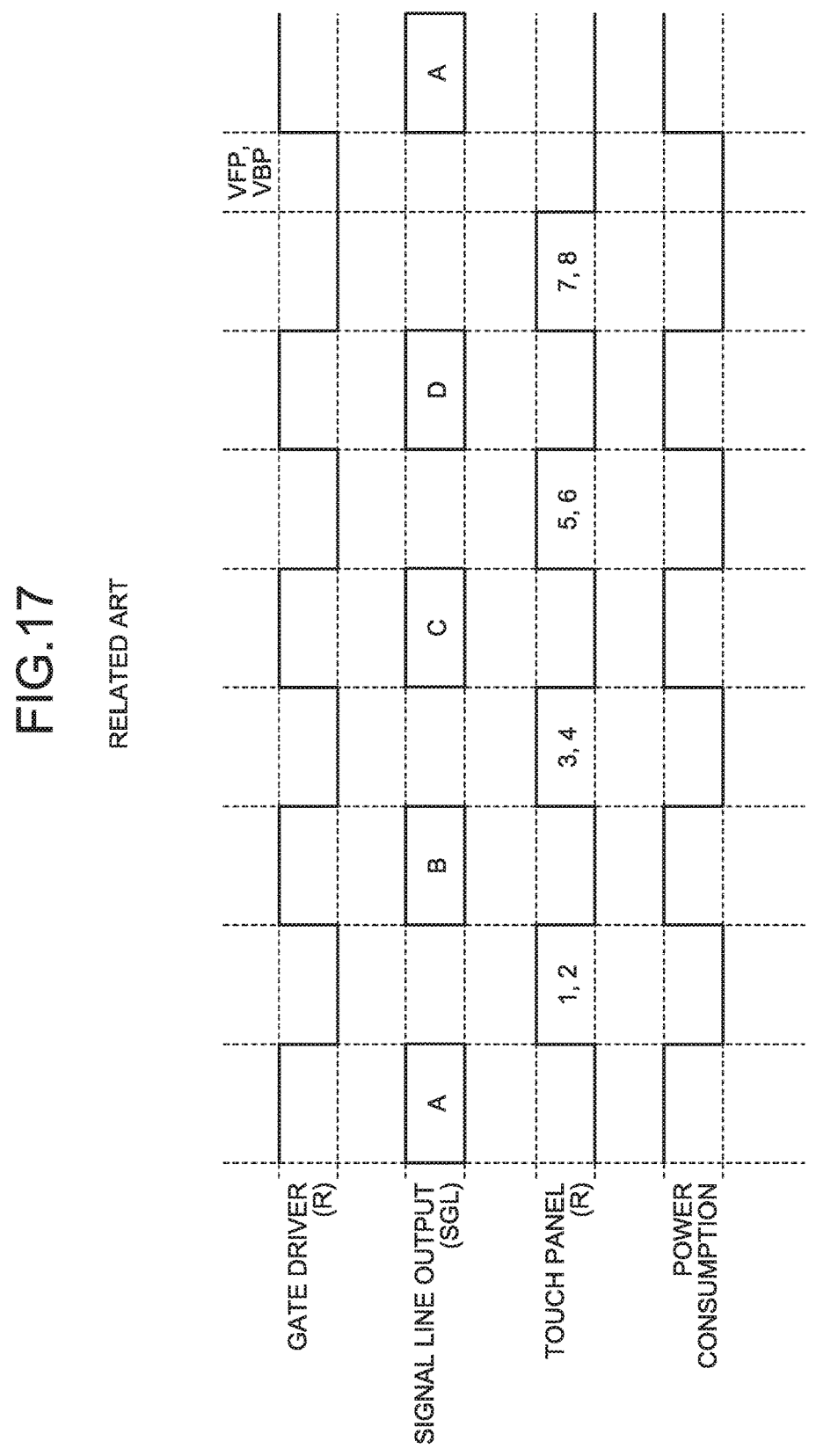

The following describes a reference example for the first embodiment with reference to FIGS. 15 to 17. FIG. 15 is a diagram illustrating wiring of the scanning lines GCL in a liquid crystal display device 200 in the related art as a reference example. FIG. 16 is a diagram illustrating wiring of the touch detection electrodes TDL and the drive electrodes COML in a touch detection device 300 in the related art as a reference example. As illustrated in FIG. 15, one scanning line GCL is provided for one line in the liquid crystal display device 200 in the related art. That is, a minimum unit for updating the image is a line unit in the liquid crystal display device 200 in the related art, and the unit for updating the image cannot be divided in the row direction. As illustrated in FIG. 16, the drive electrode COML is not divided in the row direction in the touch detection device 300 in the related art. Thus, during a time when the image is updated by the liquid crystal display device 200, the touch detection device 300 is influenced by noise in all regions in which the drive electrode COML is present in the row direction.

FIG. 17 is a timing chart illustrating a relation between the timing for updating the image and the timing for touch detection in the reference example. With the configuration of the liquid crystal display device 200 and the touch detection device 300 in the related art described with reference to FIGS. 15 and 16, when touch detection is performed during the time when the image is updated by the liquid crystal display device 200, touch detection accuracy is deteriorated due to influence of noise from the liquid crystal display device 200. Due to this, as illustrated in FIG. 17, control is performed in the related art so that touch detection is not performed during a time when the pixel signal Vpix is output to the signal line SGL and the image is updated in the display updating regions A to D with the operation of the gate driver 12, and so that the image is not updated during a time when touch detection is performed using the touch detection electrode TDL. With such control in the related art, only a half of an updating period of the image of one frame can be allocated for touch detection, and therefore it is difficult to improve touch detection accuracy and output frequency (report rate) of the touch detection result.

In such control in the related art, the output of the pixel signal Vpix that greatly influences power consumption and processing corresponding thereto are periodically turned ON/OFF. In such control, load variation and the load of the power supply PS due to an increase or decrease in power consumption are large. When the capacitor included in the power supply PS is a ceramic capacitor, a sound squeak is generated.

Modification

Figure 18:
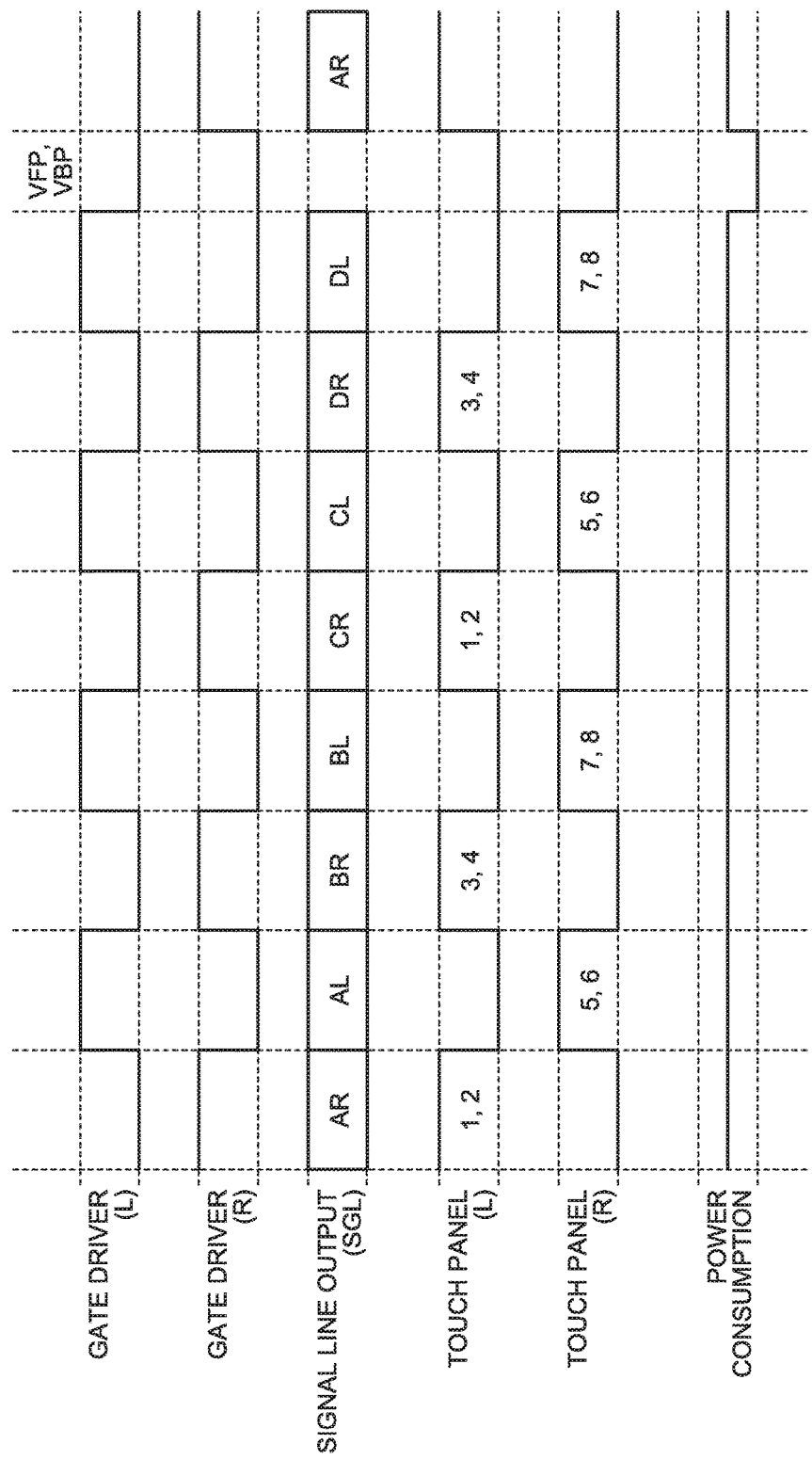
FIG. 18 is a timing chart illustrating a relation between a timing for updating an image and a timing for touch detection in a first modification.
Figure 19:
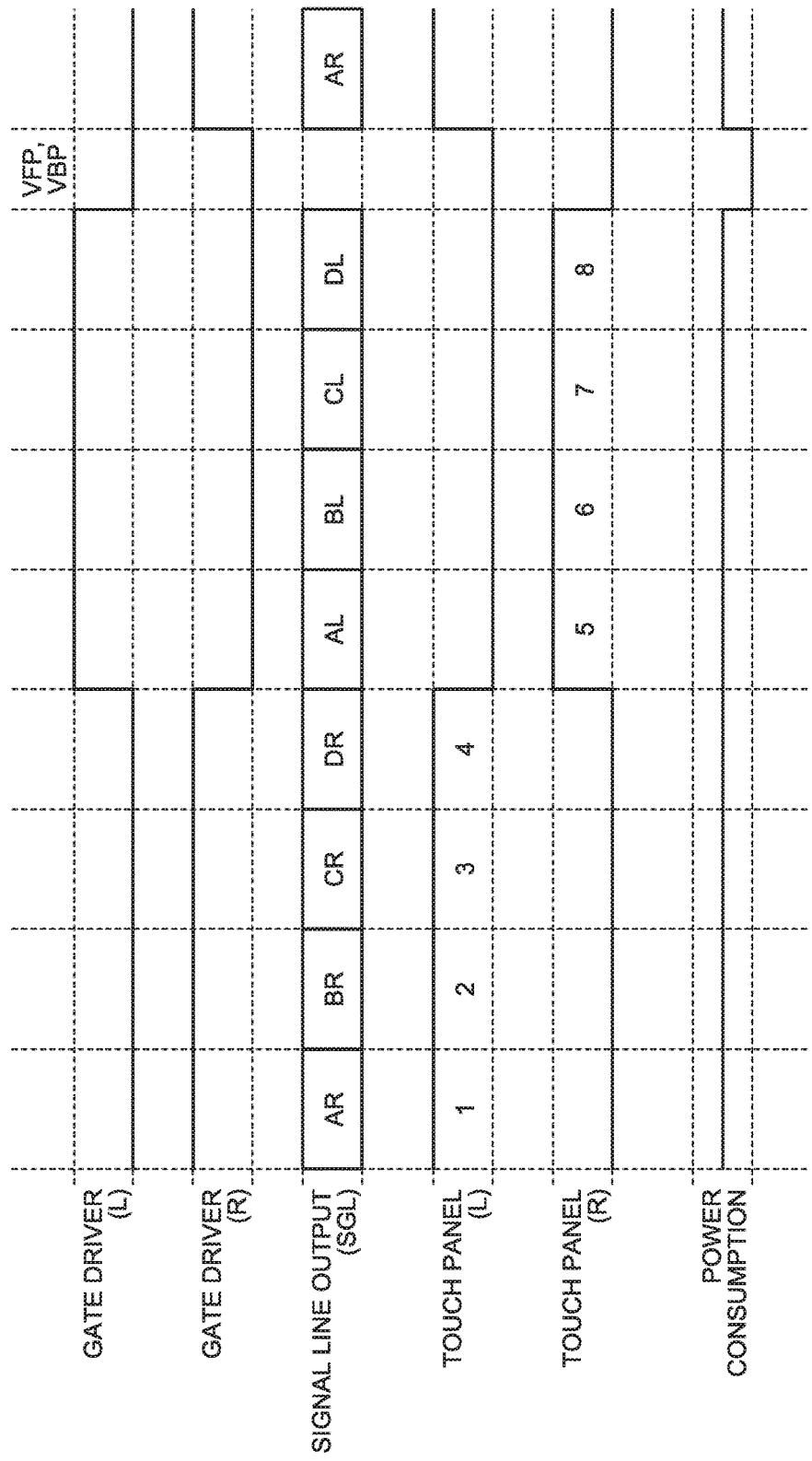
FIG. 19 is a timing chart illustrating a relation between a timing for updating an image and a timing for touch detection in a second modification.

The following describes a modification of the present invention with reference to FIGS. 18 and 19. In the description of the modification, the same component as that in the first embodiment may be denoted by the same reference numeral, and redundant description will not be repeated in some cases.

The relation between the timing for updating the image and the timing for touch detection described with reference to FIG. 14 is merely an example, and the relation is not limited thereto. For example, the relation illustrated in FIGS. 18 and 19 can be employed.

First Modification

FIG. 18 is a timing chart illustrating a relation between the timing for updating the image and the timing for touch detection in the first modification. As illustrated in FIG. 18, at a timing when the image is updated in the single display updating region in one of the left region L and the right region R, the COG 19 may perform touch detection using a plurality of touch detection electrodes TDL in the other one thereof. FIG. 18 illustrates a case of performing touch detection using two touch detection electrodes TDL in a period when touch detection is performed using one touch detection electrode TDL in the first embodiment. Alternatively, three or more touch detection electrodes TDL may be used in the same period.

According to the first modification, the report rate can be further improved as compared with the example described with reference to FIG. 14. For example, in the example illustrated in FIG. 18, a period required for one scan of all the touch detection electrodes TDL can be halved as compared with the example illustrated in FIG. 14, so that the report rate can be doubled.

Second Modification

FIG. 19 is a timing chart illustrating a relation between the timing for updating the image and the timing for touch detection in a second modification. As illustrated in FIG. 19, after successively updating the image in a plurality of display updating regions present in one of the left region L and the right region R, the COG 19 may successively update the image in a plurality of display updating regions present in the other one thereof. In this case, after successively performing touch detection using the touch detection electrodes TDL present in the other one of the left region L and the right region R, the COG 19 successively performs touch detection using the touch detection electrodes TDL present in one thereof.

According to the example illustrated in FIG. 19, frequency of switching of the operations of the two gate drivers 12a and 12b can be further reduced. For example, when the gate drivers 12a and 12b are shift registers, in cases illustrated in FIGS. 16 and 18, supply of the scanning signal to the scanning lines GCL coupled to the gate drivers 12a and 12b needs to be temporarily interrupted, so that a transfer circuit or a signal holding circuit such as a latch circuit that is not coupled to the scanning line needs to be separately arranged, or start pulses for the respective drive timings need to be provided. However, according to the example illustrated in FIG. 19, the scanning signal can be sequentially supplied to the scanning lines GCL coupled to the gate drivers 12a and 12b, so that a circuit required for interruption processing can be omitted.

The timing control according to the modification of the present invention has been described above with reference to FIGS. 18 and 19. However, the embodiment is not limited to the specific examples of the report rate, the display order, and the touch detection order according to the first embodiment described with reference to FIG. 14, and the first and second modifications described with reference to FIGS. 18 and 19. The report rate, the display order, and the touch detection order can be set in a desirable manner within a range satisfying the characteristic of the present invention described in claims.

Third Modification

Figure 20:
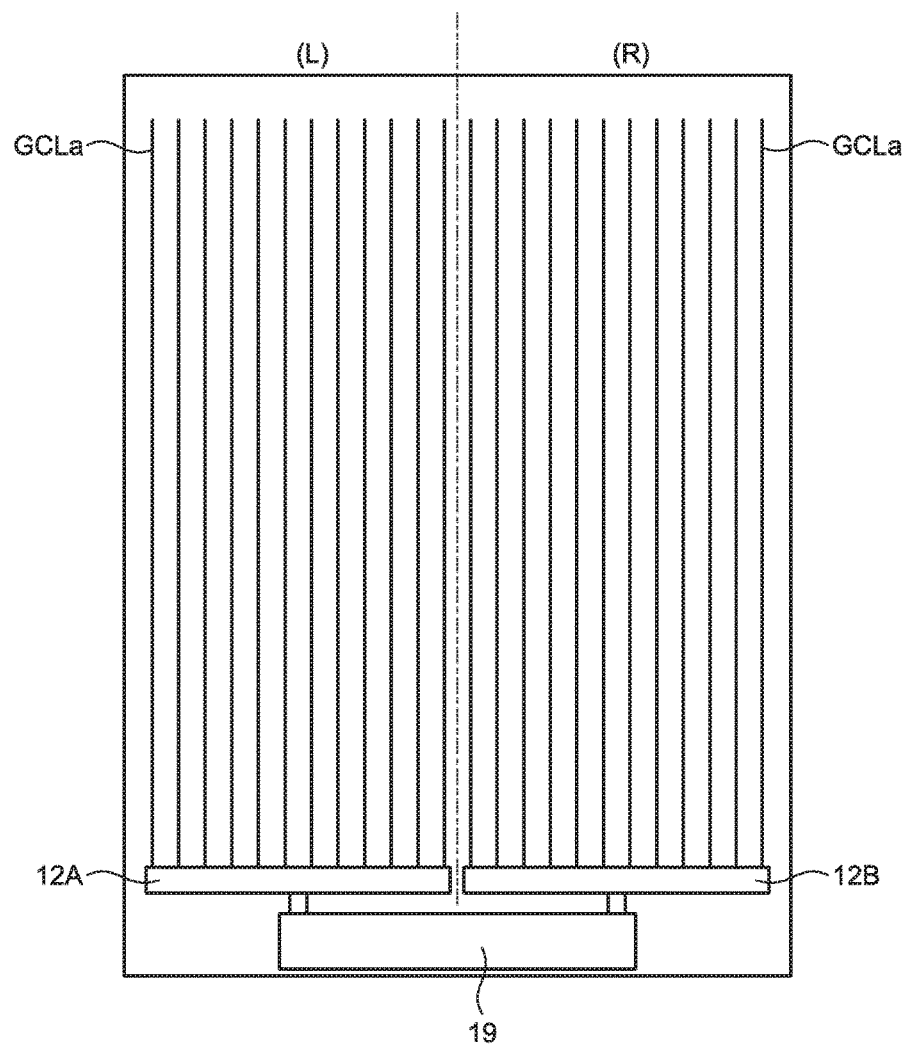
FIG. 20 is a diagram illustrating an arrangement example of scanning lines in a third modification.

FIG. 20 is a diagram illustrating an arrangement example of scanning lines GCLa in a third modification. For example, FIG. 9 exemplifies a configuration in which the scanning lines GCL positioned on the same straight line along the row direction are individually arranged for respective partial regions. However, this is merely an example of the arrangement of the scanning lines GCL included in the partial regions, and the arrangement is not limited thereto. One partial region includes one sub-display region among the sub-display regions and one sub-touch detection region among the sub-touch detection regions, the one sub-touch detection being arranged at the same position as the one sub-display region. For example, as illustrated in FIG. 20, an arrangement direction of a plurality of scanning lines GCLa may be identical to an arrangement direction of a plurality of partial regions. In this case, in an extending direction of one scanning line GCLa, another scanning line is not arranged on the same straight line. The scanning signal Vscan is output to the scanning lines GCLa by gate drivers 12A and 12B for respective partial regions.

Fourth Modification

Figure 21:
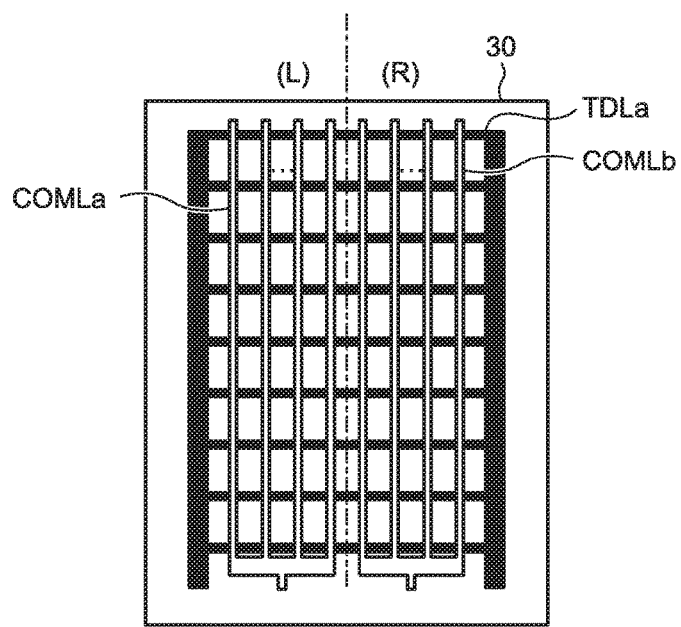
FIG. 21 is a diagram illustrating an arrangement example of first drive electrodes, second drive electrodes, and touch detection electrodes in a fourth modification.

FIG. 21 is a diagram illustrating an arrangement example of first drive electrodes COMLa, second drive electrodes COMLb and touch detection electrodes TDLa in a fourth modification. For example, FIG. 11 exemplifies a configuration in which the extending direction of the drive electrode COML is along a short side of the display region, and the extending direction of the touch detection electrode TDL is along a long side of the display region. However, this is merely an arrangement example of the drive electrode and the touch detection electrode, and the arrangement is not limited thereto. For example, as illustrated in FIG. 21, the extending direction of the first drive electrode COMLa and the second drive electrode COMLb may be along the long side of the display region and the extending direction of the touch detection electrode TDLa may be along the short side of the display region. The first drive electrode COMLa and the second drive electrode COMLb illustrated in FIG. 21 are drive electrodes in different partial regions, and are individually driven.

The arrangement of various pieces of wiring and electrodes such as the scanning line, the drive electrode, and the touch detection electrode can be appropriately changed within a range in which the operations of a plurality of partial display units and a plurality of partial detection units can be controlled so that the position of the display updating region in which the image is updated during a predetermined period is different from the position of the sub-touch detection region (touch detection target region) on which touch detection is performed during the predetermined period.

Second Embodiment

Figure 22:
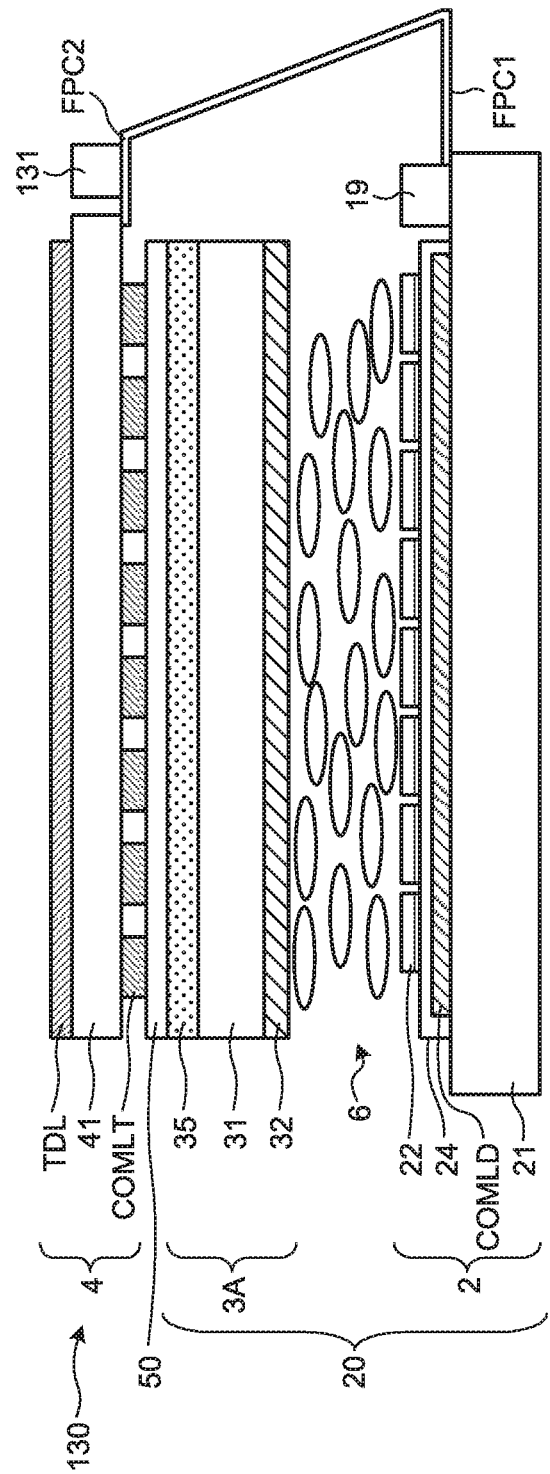
FIG. 22 is a cross-sectional view of a schematic structure of a display device with a touch detection function according to a second embodiment.
Figure 23:
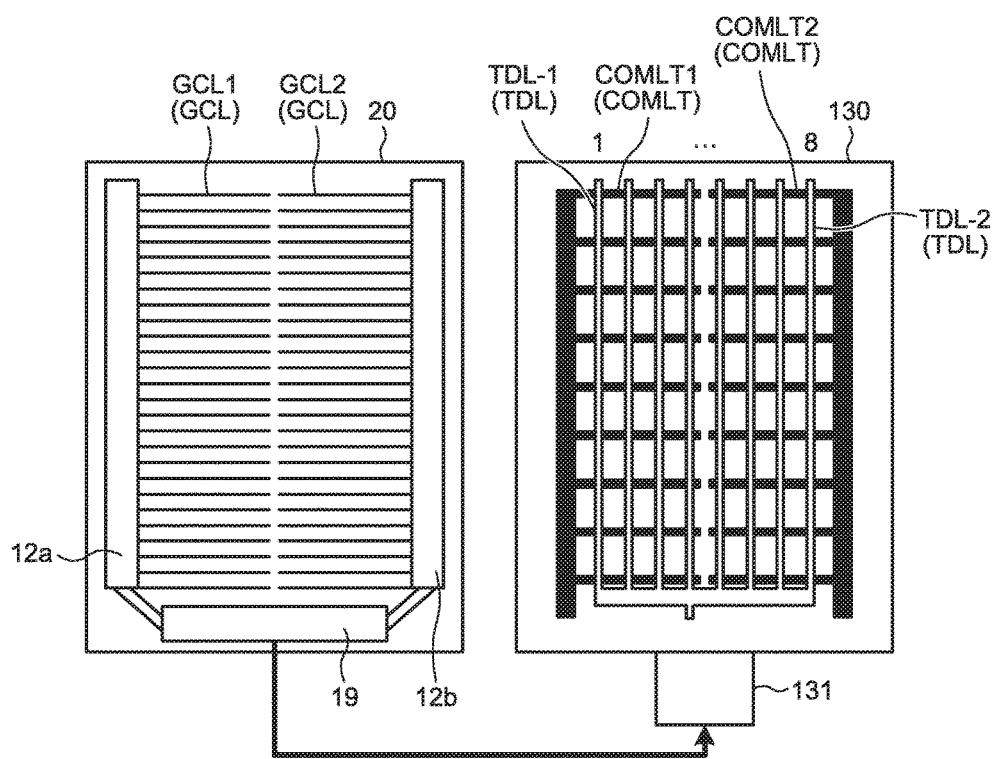
FIG. 23 is a diagram illustrating a form of a liquid crystal display device and a touch detection device according to the second embodiment.

Next, the following describes a second embodiment of the present invention with reference to FIGS. 22 and 23. In the description of the second embodiment, the same component as that in the first embodiment may be denoted by the same reference numeral, and redundant description will not be repeated in some cases. FIG. 22 is a cross-sectional view of a schematic structure of the display device with a touch detection function according to a second embodiment. FIG. 23 is a diagram illustrating a form of the liquid crystal display device 20 and a touch detection device 130 according to the second embodiment. As illustrated in FIG. 22, the touch detection device 130 and the liquid crystal display device 20 are provided separately. A specific configuration of the display device (liquid crystal display device 20) according to the second embodiment is, for example, obtained by eliminating the touch detection electrode TDL of the touch detection device 30 and the configuration for operating the touch detection electrode TDL (touch detection processing device 40 and the like) from the configuration of the display apparatus 1 with a touch detection function according to the first embodiment. The same configuration as that in the first embodiment is employed for the drive electrode COML. For example, as illustrated in FIG. 22, a second substrate 3A includes the glass substrate 31, the color filter 32 arranged on one surface of the glass substrate 31, and the polarizing plate 35 arranged on the other surface of the glass substrate 31, and the touch detection electrode TDL is not arranged thereon.

The touch detection device 130 according to the second embodiment has only the touch detection electrode TDL of the touch detection device 30 and the component (touch detection processing device 40 and the like) for operating the touch detection electrode TDL among the components of the display apparatus 1 with a touch detection function according to the first embodiment. However, as illustrated in FIGS. 22 and 23, the touch detection device 130 includes a dedicated touch drive electrode COMLT for touch detection and a dedicated display drive electrode COMLD for display in place of the drive electrodes COML in the first embodiment. That is, in the second embodiment, the display drive electrode COMLD and the touch drive electrode COMLT are independent of each other. The touch drive electrodes COMLT include a first touch drive electrode COMLT1 in the left region L and a second touch electrode COMLT2 in the right region R. Similarly, the display drive electrodes COMLD include a first display drive electrode in the left region L and a second display drive electrode in the right region R. For example, as illustrated in FIG. 22, the touch detection device 130 includes a third substrate 4 arranged to be opposed to the second substrate 3A. The second substrate 3A has a configuration obtained by eliminating the touch detection electrode TDL from the configuration of the second substrate 3 described above. The second substrate 3A is bonded to the third substrate 4 via a bonding layer 50. The third substrate 4 includes a glass substrate 41, the touch detection electrode TDL arranged on one surface of the third substrate 4, and the drive electrode COMLT arranged on the other surface of the third substrate 4. In this way, in the second embodiment, the touch drive electrode (COMLT) related to touch detection and the display electrode of the pixel (display drive electrode COMLD) are separately provided. The touch detection device 130 further includes an operation control circuit 131. The operation control circuit 131 is a circuit having a function of the touch detection processing device 40 according to the first embodiment and a function of performing an operation related to touch detection (a scanning operation for outputting the touch drive signal Vcomt along the scan direction Scan, for example) of the drive electrode driver 14. The operation control circuit 131 may be arranged on the glass substrate 41, or may be arranged on a printed circuit board FPC2 coupled to the third substrate 4.

The COG 19 according to the second embodiment causes the liquid crystal display device 20 to be synchronized with the touch detection device 130 with a synchronizing signal. Specifically, as illustrated in FIGS. 22 and 23, a printed circuit board FPC1 coupled to the first substrate 2 is coupled to the printed circuit board FPC2 coupled to the third substrate 4, and the COG 19 outputs the synchronizing signal to the operation control circuit 131 arranged in the touch detection device 130. The synchronizing signal includes at least information on a region in which the image is updated, the region being one of the left region L and the right region R, and information on a timing at which the image is updated. More specifically, for example, the synchronizing signal is a periodic signal indicating a predetermined reference numeral (for example, an individual reference numeral for designating any one of the eight display updating regions AL, AR, BL, BR, CL, CR, DL, and DR) and a timing for starting to update the image in the display updating region indicated by the reference numeral. The operation control circuit 131 outputs the touch drive signal Vcomt to the touch drive electrode COMLT so as to perform touch detection on the sub-touch detection region in a region (one of the left region L and the right region R) different from the sub-display region (the other one of the left region L and the right region R) including the position of the display updating region indicated by the synchronizing signal, and performs touch detection by detecting the touch detection signal Vdet from the touch detection electrode TDL in the sub-touch detection region. When the scanning signal Vscan is applied to the first scanning line GCL1, the touch drive signal Vcomt is output to the second touch drive electrode COMLT2. The second touch drive electrode COMLT2 is different from the first touch drive electrode COMLT1 facing the pixel electrode 22 coupled to the first scanning line GCL1 via the TFT element Tr.

According to the second embodiment, even when the touch drive electrode COMLT and the display electrode of the pixel (display drive electrode COMLD) are separately provided, the operation of the liquid crystal display device 20 can be caused to be performed in parallel with the operation of the touch detection device 130, and influence on the touch detection device 130 by noise that may be caused in accordance with the operation of the liquid crystal display device 20 can be reduced at the same time, as in the case of the first embodiment. Accordingly, more time is easily allocated for touch detection as compared with time division control in the related art, and touch detection accuracy of touch detection taking more time and output frequency (report rate) of the touch detection result can be improved more easily.

According to the second embodiment, the touch detection device 130 and the liquid crystal display device 20 are provided separately, so that influence of noise between the devices can be reduced more easily. In the present embodiment, the polarizing plate 35 is arranged on the glass substrate 31, but the embodiment is not limited thereto. The polarizing plate 35 may be arranged on the glass substrate 41. The touch detection electrode TDL and the touch drive electrode COMLT are arranged on one surface and the other surface of the same glass substrate 41, respectively, but the embodiment is not limited thereto. For example, by arranging the electrodes in a matrix to be coupled to each other via a bridge electrode, the touch detection electrode TDL and the touch drive electrode COMLT may be arranged on any one of the surfaces of the glass substrate 41. A glass substrate 51 may be further arranged facing the glass substrate 41, and each of the touch detection electrode TDL and the touch drive electrode COMLT may be arranged on any one of the glass substrate 51 and the glass substrate 41. A film substrate may be used in place of the glass substrate 41.

Third Embodiment

Figure 24:
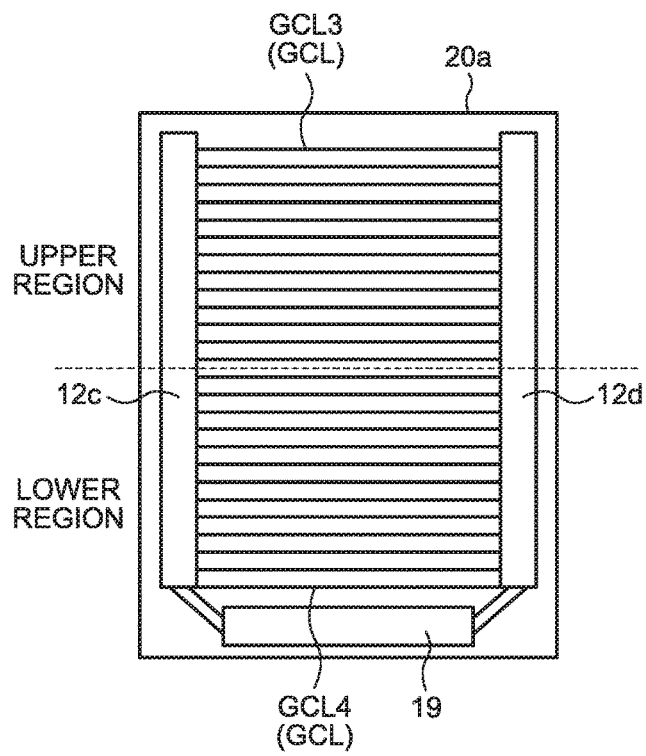
FIG. 24 is a diagram illustrating wiring of scanning lines in a liquid crystal display device according to a third embodiment.
Figure 25:
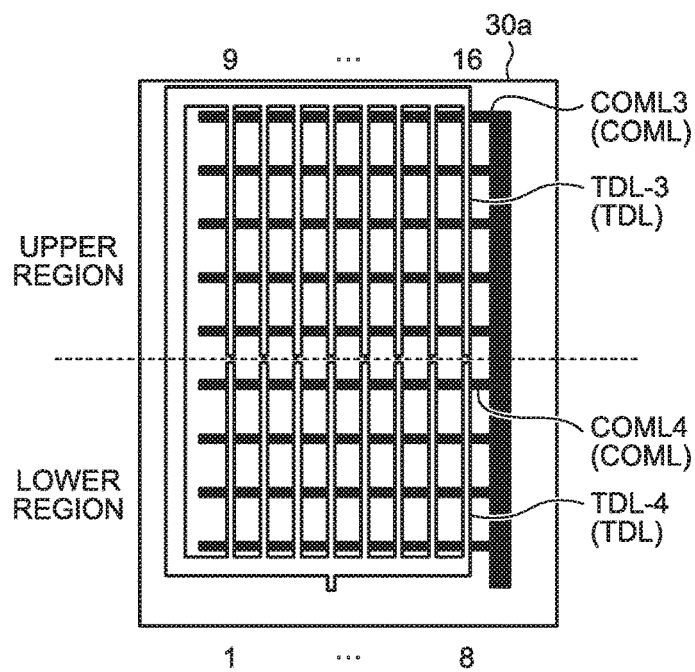
FIG. 25 is a diagram illustrating wiring of touch detection electrodes and drive electrodes in a touch detection device according to the third embodiment.

Next, the following describes a third embodiment of the present invention with reference to FIGS. 24 and 25. In the description of the third embodiment, the same component as that in the first embodiment may be denoted by the same reference numeral, and redundant description will not be repeated in some cases. FIG. 24 is a diagram illustrating wiring of the scanning lines GCL in a liquid crystal display device 20a according to the third embodiment. FIG. 25 is a diagram illustrating wiring of the touch detection electrodes TDL and the drive electrodes COML in a touch detection device 30a according to the third embodiment.

The liquid crystal display device 20a according to the third embodiment is different from the liquid crystal display device 20 according to the first embodiment in a specific form of wiring of the scanning line GCL. The liquid crystal display device 20a includes a plurality of scanning lines GCL parallel to each other along the scanning direction (column direction) of the screen. Specifically, as illustrated in FIG. 24, one scanning line GCL is arranged for one line in the liquid crystal display device 20a, and the scanning line GCL is continuous between a gate driver 12c and a gate driver 12d to couple the two gate drivers 12c and 12d to each other. Thus, a minimum unit for updating the image is a line unit in the liquid crystal display device 20a according to the third embodiment. In the description according to the third embodiment, exemplified is a case of applying the scanning signal Vscan to the scanning line GCL by the two gate drivers 12c and 12d, but the embodiment is not limited thereto. For example, the scanning signal Vscan may be applied by only one of the gate drivers. In other words, a third scanning line GCL3 and a fourth scanning line GCL4 are respectively arranged in an upper region (third region) and a lower region (fourth region) that are adjacent to each other in the same direction as the scanning direction (second direction).

In the same manner as the touch detection device 30 according to the first embodiment, the touch detection device 30a according to the third embodiment includes a plurality of partial detection units including one or more of a plurality of touch detection electrodes TDL parallel to each other and one or more of a plurality of drive electrodes COML, the drive electrodes COML being parallel to each other along a direction different from an arrangement direction of the touch detection electrodes TDL parallel to each other, capacitance being formed between the drive electrodes COML and the touch detection electrodes TDL. However, the touch detection device 30a according to the third embodiment is different from the touch detection device 30 according to the first embodiment in a specific arrangement of the touch detection electrode TDL and the drive electrode COML.

In the touch detection device 30a, two touch detection electrodes TDL are arranged in the scanning direction (column direction). Specifically, as illustrated in FIG. 25 for example, two touch detection electrode groups each of which includes a plurality of (in FIG. 25, eight) touch detection electrodes TDL arranged along the row direction are arranged on an upper side and a lower side of the touch detection region, respectively. The third touch detection electrodes TDL-3 in the upper region to which the numbers 9 to 16 are given and the fourth touch detection electrodes TDL-4 in the lower region to which the numbers 1 to 8 are given are arranged adjacent to each other.

In the third embodiment, as the drive electrodes COML, the third drive electrode COML3 the fourth drive electrode COML 4 are arranged in the upper region and the lower region, respectively. The third drive electrode COML3 and the third touch detection electrode TDL-3 overlap each other when viewed from the third direction. The fourth drive electrodes COML4 and the fourth touch detection electrodes TDL-4 overlap each other when viewed from the third direction. extends in the row direction to intersect with all the touch detection electrodes TDL (having the numbers 1 to 8, or the numbers 9 to 16) arranged along the row direction. In this way, the drive electrode COML according to the third embodiment is continuous in the row direction.

Figure 26:
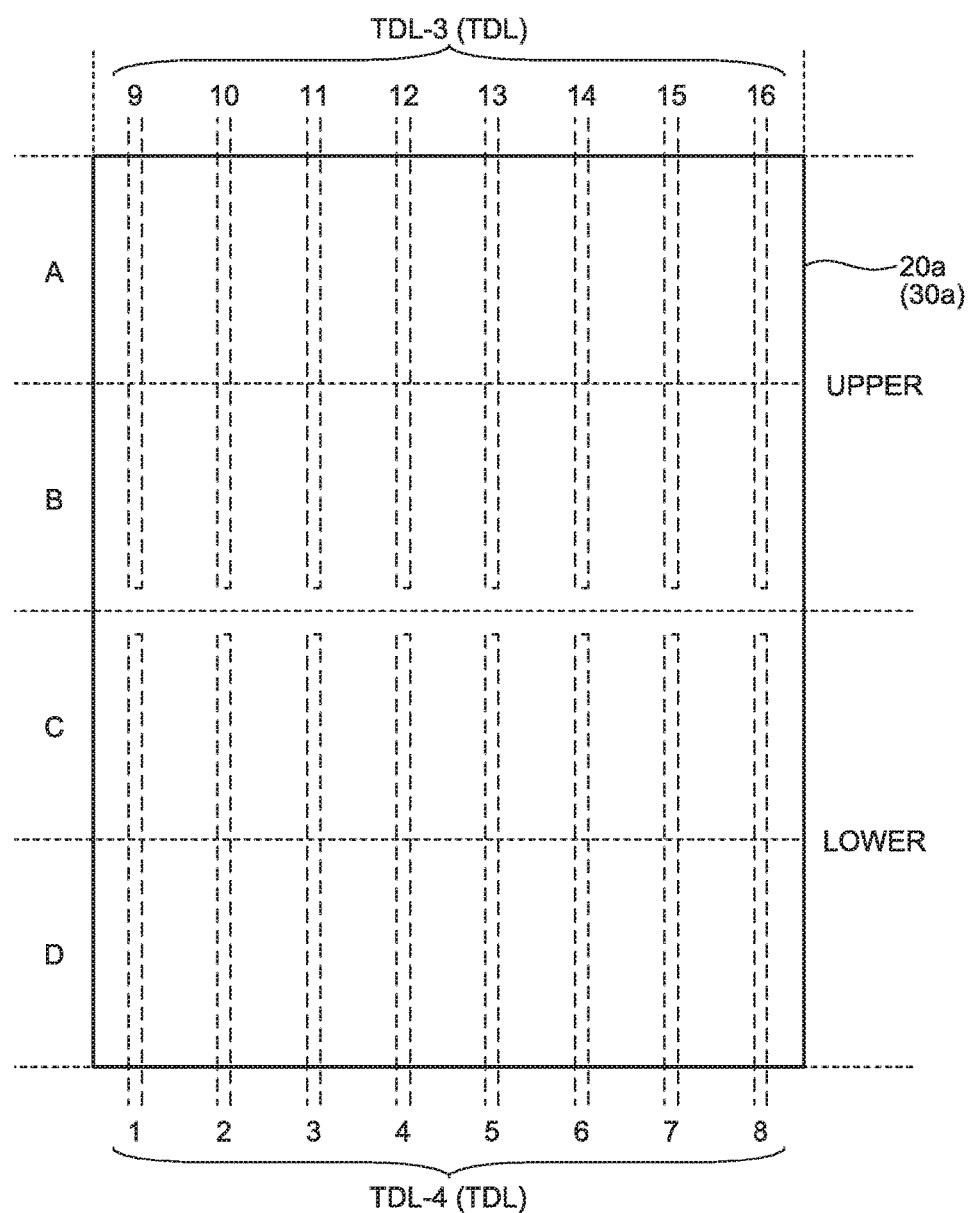
FIG. 26 is a diagram illustrating an example of a relation between a partition of display updating regions and an arrangement of the touch detection electrodes according to the third embodiment.

FIG. 26 is a diagram illustrating an example of a relation between a partition of the display updating regions and the arrangement of the touch detection electrodes TDL according to the third embodiment. In the third embodiment, two display updating regions in which the image is updated are arranged in the scanning direction, and two touch detection regions on which touch detection is individually performed by a plurality of partial detection units are arranged in the scanning direction. Specifically, as illustrated in FIG. 26 for example, the display updating regions according to the third embodiment are obtained by dividing the display region into two or more display updating regions (for example, four display updating regions of A, B, C, and D) in the scanning direction (column direction). The sub-touch detection regions according to the third embodiment are arranged so as to divide the touch detection region into two parts, that is, an upper part and a lower part in the scanning direction (column direction). With such a configuration, touch detection and display can be individually performed for each region divided along the scanning signal. For example, in the third embodiment, while display is performed on one of the third region (upper region) and the fourth region (lower region) divided along the scanning signal, touch detection can be performed on the other one thereof at the same time. Specifically, while the scanning signal Vscan is applied to the third scanning line GCL3 in the upper region and the display drive signal Vcomd is applied to the third drive electrode COML3 in the upper region, the touch drive signal Vcomt can be applied to the fourth drive electrode COML4 in the lower region and the detection signal Vdet can be detected from the touch detection electrodes TDL-4 (the numbers 1 to 8) in the lower region. While the scanning signal Vscan is applied to the fourth scanning line GCL4 in the lower region and the display drive signal Vcomd is applied to the fourth drive electrode COML4 in the lower region, the touch drive signal Vcomt can be applied to the third drive electrode COML3 in the upper region and the detection signal Vdet can be detected from the third touch detection electrodes TDL-3 (the numbers 9 to 16) in the upper region. The touch detection electrodes TDL are located along the direction intersecting with the scanning direction, so that noise caused by performing display can be prevented from affecting touch detection via the touch detection electrode TDL in performing touch detection on one of the upper region and the lower region.

FIG. 27 is a timing chart illustrating an example of a relation between the timing for updating the image and the timing for touch detection according to the third embodiment. The COG 19 according to the third embodiment controls a range in which scanning is performed by the display unit and operations of a plurality of partial detection units so that the position of the display updating region in which the image is updated during a predetermined period is different from the position of the sub-touch detection region (touch detection target region) on which touch detection is performed during the predetermined period. Specifically, as illustrated in FIG. 27 for example, the COG 19 causes the gate drivers 12c and 12d to output the scanning signal Vscan to the third scanning line GCL3 in the display updating region A and causes the drive electrode driver 14 to apply the display drive signal Vcomd to the third drive electrode COML3 in the display updating region A at a timing when the pixel signal Vpix for updating the image in the display updating region A of the upper region is output to the signal line SGL. At the same time, the COG 19 causes the drive electrode driver 14 to apply the touch drive signal Vcomt to the fourth drive electrode COML4 in the lower region, and performs touch detection based on the touch detection signal Vdet from the touch detection electrodes TDL4 (the numbers 1 to 4) in the sub-touch detection region of the lower region. At this timing, updating of the image in the upper region is parallel with touch detection in the lower region. When the scanning signal Vscan is applied to the third scanning line GCL3, the touch drive signal Vcomt is output to the fourth touch drive electrode COML4. The fourth touch drive electrode COML4 is different from the third touch drive electrode COML3 facing the pixel electrode 22 coupled to the third scanning line GCL3 via the TFT element Tr.

At a timing when the pixel signal Vpix for updating the image in the display updating region C of the lower region is output to the signal line SGL, the COG 19 causes the gate drivers 12c and 12d to output the scanning signal Vscan to the fourth scanning line GCL4 in the display updating region C, and causes the drive electrode driver 14 to apply the display drive signal Vcomd to the fourth drive electrode COML4 in the display updating region C. At the same time, the COG 19 causes the drive electrode driver 14 to apply the touch drive signal Vcom to the third drive electrode COML3 in the upper region, and performs touch detection based on the touch detection signal Vdet from the third touch detection electrodes TDL-3 (the numbers 9 to 12) in the sub-touch detection region of the upper region. At this timing, updating of the image in the lower region is parallel with touch detection in the upper region.

The COG 19 updates the image in the display updating regions A, C, B, and D in this order using the mechanism described above, and performs touch detection in order of the numbers 1 to 4, 9 to 12, 5 to 8, and 13 to 16 in parallel with the updating of the image.

According to the third embodiment, the same effect as that of the first embodiment can be exhibited. That is, the operation of the liquid crystal display device 20 can be caused to be performed in parallel with the operation of the touch detection device 30, and, at the same time, influence on the touch detection device 30 by noise that may be caused in accordance with the operation of the liquid crystal display device 20 can be reduced. Accordingly, more time is easily allocated for touch detection as compared with time division control in the related art, and touch detection accuracy of touch detection taking more time and output frequency (report rate) of the touch detection result can be improved more easily.

Variation in power consumption can be reduced, so that load variation and a load of the power supply PS can be made smaller. Even when the capacitor included in the power supply PS is a ceramic capacitor, periodic variation in power consumption caused by ON/OFF of the output of the pixel signal Vpix and by the corresponding operation related to updating of the image can be reduced, so that generation of a sound squeak can be reduced.

The switch timing of the display updating region in which the image is updated is the same as the switch timing of the sub-touch detection region on which touch detection is performed, so that the same periodic signal (clock signal and the like) can be used for managing the switch timings. The switch timings are caused to be the same, so that a portion in which the image is updated easily alternates with a portion on which touch detection is performed, and it becomes more easy to cause the operation of the liquid crystal display device 20 to be performed in parallel with the operation of the touch detection device 30, and, at the same time, to reduce influence on the touch detection device 30 by noise that may be caused in accordance with the operation of the liquid crystal display device 20.

The third embodiment can be combined with the second embodiment. That is, the liquid crystal display device 20a and the touch detection device 30a may be provided separately. As in the case of a relation between the first embodiment and the modification, the report rate, the display order, and the touch detection order can be set in a desirable manner also in the third embodiment within a range satisfying the characteristic of the present invention described in claims.

Each of the display region and the touch detection region is divided in two parts in the row direction in the first and second embodiments described above, and the touch detection region is divided into two parts in the scanning direction (column direction) in the third embodiment. The two parts may be equal parts or non-equal parts. Alternatively, each of the display updating region and the touch detection region may be divided into three or more parts instead of two parts. In this case, the scanning line GCL, the drive electrode COML, and the touch detection electrode TDL are individually arranged in accordance with the number of parts so that updating of the image and touch detection can be individually performed in each divided region.

The switch timing of the display updating region in which the image is updated is not necessarily the same as the switch timing of the sub-touch detection region on which touch detection is performed. For example, a touch detection timing may be an intermittent timing including an interval, or the switch timing of the display updating region may be simply shifted from the switch timing of the touch detection region on which touch detection is performed.

Each of the touch detection devices 30 and 30a described in the above embodiments is a touch detection device using what is called a mutual capacitance system of a capacitance system. However, the mutual capacitance system is merely an example of a touch detection system, and the system is not limited thereto. The touch detection system can be appropriately modified. For example, a self capacitance system may be used. For example, in a case of the self capacitance system, a plurality of drive electrodes (touch electrodes) are arranged in a matrix excluding the touch detection electrode according to the embodiments, and the touch drive signal Vcomt or the display drive signal Vcomd may be applied to the drive electrode for each region obtained by dividing the screen in a direction intersecting with the scanning direction of the scanning line GCL.

The embodiments of the present invention including the modifications exemplify the liquid crystal display apparatus as a disclosure example of the display apparatus. Other application examples include various flat-panel type display apparatuses such as an organic electroluminescence (EL) display apparatus and other self-luminous display apparatuses. All of small-sized, middle-sized, and large-sized display apparatuses can be naturally applied without limitation.

The present invention naturally encompasses other working effects caused by the aspects described in the embodiments of the present invention including the modifications that are obvious from the description herein or that are appropriately conceivable by those skilled in the art.

What is claimed is:

1. A display apparatus comprising:
a plurality of pixel electrodes,
a plurality of scanning lines, wherein each of the plurality of scanning lines is coupled to some of the plurality of pixel electrodes,
the plurality of scanning lines include a first scanning line and a second scanning line, and the first scanning line is adjacent to the second scanning line in a first direction;
a plurality of touch drive electrodes, wherein
the plurality of touch drive electrodes include a first touch drive electrode and a second touch drive electrode, and the first touch drive electrode is adjacent to the second touch drive electrode in the first direction; and
an operation controller, wherein the operation controller is configured to
provide a display scanning signal to a selected scanning line of the plurality of scanning lines and scan the plurality of scanning lines in a second direction and
provide a touch drive signal to a selected touch drive electrode of the plurality of touch drive electrodes that is not coupled to the selected scanning line,
wherein each of the plurality of touch drive electrodes is opposed to some of the plurality of pixel electrodes, and
wherein the operation controller is configured to provide the touch drive signal to the selected touch drive electrode that is not opposed to a selected pixel electrode of the plurality of pixel electrodes, the selected pixel electrode being coupled to the selected scanning line.

2. The display apparatus according to claim 1,
wherein the operation controller is configured to perform providing the display scanning signal to the selected scanning line and providing the touch drive signal to the selected touch drive electrode in parallel.

3. The display apparatus according to claim 1,
wherein the plurality of pixel electrodes include a first pixel electrode and a second pixel electrode,
wherein the first pixel electrode is coupled to the first scanning line and opposed to the first touch drive electrode, and
wherein the second pixel electrode is coupled to the second scanning line and opposed to the second touch drive electrode.

4. The display apparatus according to claim 1,
wherein a first switching timing at which the operation controller switches the selected scanning line is the same time as a second switching timing at which the operation controller switches the selected touch drive electrode.

5. The display apparatus according to claim 1,
further comprising a plurality of pixels,
wherein the plurality of touch drive electrodes double as display electrodes of the plurality of pixels.

6. The display apparatus according to claim 1,
wherein the plurality of touch drive electrodes are different from display electrodes of the plurality of pixels, and
wherein the operation controller is configured to control providing the touch drive signal and providing the display scanning signal based on a synchronizing signal.

7. A display apparatus comprising:
a plurality of pixels,
a plurality of scanning lines, wherein the plurality of scanning lines include a first scanning line and a second scanning line, and the first scanning line is adjacent to the second scanning line in a first direction;
a plurality of touch drive electrodes, wherein the plurality of touch drive electrodes include a first touch drive electrode and a second touch drive electrode, and the first touch drive electrode is adjacent to the second touch drive electrode in the first direction; and
an operation controller, wherein the operation controller is configured to
provide a display scanning signal to a selected scanning line of the plurality of scanning lines and scan the plurality of scanning lines in a second direction and
provide a touch drive signal to a selected touch drive electrode of the plurality of touch drive electrodes that is not coupled to the selected scanning line,
wherein the plurality of touch drive electrodes are different from display electrodes of the plurality of pixels, and
wherein the operation controller is configured to control providing the touch drive signal and providing the display scanning signal based on a synchronizing signal.

8. A display apparatus comprising:
a plurality of pixel electrodes;
a plurality of scanning lines, wherein each of the plurality of scanning lines is coupled to some of the plurality of pixel electrodes;
a plurality of touch detection electrodes, wherein the plurality of touch detection electrodes include a first touch detection electrode and a second touch detection electrode, and the first touch detection electrode is adjacent to the second touch detection electrode in a first direction; and
an operation controller, wherein the operation controller is configured to
provide a display scanning signal to a selected scanning line of the plurality of scanning lines and scan the plurality of scanning lines in a second direction and
control such that a selected touch detection electrode of the plurality of touch detection electrodes outputs a touch detection signal, wherein the selected touch detection electrode is not coupled the selected scanning line,
wherein each of the plurality of touch detection electrodes is opposed to some of the plurality of pixel electrodes, and wherein the operation controller is configured such that the selected touch detection electrode is not opposed to a selected pixel electrode of the plurality of pixel electrodes,
the selected pixel electrode being coupled to the selected scanning line.

9. The display apparatus according to claim 8,
wherein the plurality of scanning lines include a first scanning line and a second scanning line, and
wherein the first scanning line is adjacent to the second scanning line in a first direction.

* * * * *